(12) United States Patent
Hyun et al.

(10) Patent No.: US 12,744,739 B2
(45) Date of Patent: Sep. 22, 2026

(54) DEVICE AND METHOD FOR PROCESSING TRAFFIC USING SWITCH

(71) Applicant: Samsung Electronics Co., Ltd., Suwon-si (KR)

(72) Inventors: Dowon Hyun, Suwon-si (KR); Seunghoon Park, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 24 days.

(21) Appl. No.: 18/936,322

(22) Filed: Nov. 4, 2024

(65) Prior Publication Data

US 2025/0062996 A1 Feb. 20, 2025

Related U.S. Application Data

(63) Continuation of application No. PCT/KR2023/003537, filed on Mar. 16, 2023.

(30) Foreign Application Priority Data

May 9, 2022 (KR) ........................ 10-2022-0056916

(51) Int. Cl.
*H04L 47/2483* (2022.01)
*G06F 13/40* (2006.01)
(Continued)

(52) U.S. Cl.
CPC ...... *H04L 47/2483* (2013.01); *G06F 13/4022* (2013.01); *H04L 12/4633* (2013.01); *H04L 47/125* (2013.01)

(58) Field of Classification Search
CPC ............. G06F 13/4022; H04L 47/2483; H04L 47/125; H04L 12/4633
See application file for complete search history.

(56) References Cited

U.S. PATENT DOCUMENTS 9,036,636 B1 * 5/2015 Sherwood ............... H04L 45/04 370/392
9,124,526 B2 9/2015 Ooishi
(Continued)

FOREIGN PATENT DOCUMENTS

CN 109962832 A * 7/2019 ......... H04L 12/4641
CN 113068175 A 7/2021
(Continued)

OTHER PUBLICATIONS

Translation of CN-109962832-A (Year: 2019).*
(Continued)

*Primary Examiner* — Henry Tsai
*Assistant Examiner* — John B Roche
(74) *Attorney, Agent, or Firm* — Jefferson IP Law, LLP

(57) ABSTRACT

A method, in a communication system, carried out by a switch server comprising a programmable switch and one or more field programmable gate arrays (FPGAs) is provided. The method includes receiving information related to a flow table from an offloading server, receiving data packets, identifying a FPGA corresponding to the data packets, identifying whether the data packets match a flow entry of a flow table of the FPGA, in case that the data packets match the flow entry of the flow table, processing the data packets based on the flow entry and transmitting the processed data packet, and in case that the data packets do not match the entry of the flow table, providing the data packets to the offloading server.

20 Claims, 19 Drawing Sheets

(51) Int. Cl.

| | |
|---|---|
| ***H04L 12/46*** | (2006.01) |
| ***H04L 47/125*** | (2022.01) |

(56) References Cited

U.S. PATENT DOCUMENTS

| | | | | |
|---|---|---|---|---|
| 9,973,400 | B2 * | 5/2018 | Su | H04L 69/22 |
| 10,382,346 | B2 | 8/2019 | Murugesan et al. | |
| 10,841,838 | B2 | 11/2020 | Zhang et al. | |
| 11,134,416 | B2 | 9/2021 | Kotecha et al. | |
| 11,431,621 | B2 | 8/2022 | Bagwell et al. | |
| 2020/0371828 | A1 | 11/2020 | Chiou et al. | |
| 2021/0029586 | A1 | 1/2021 | Zhu et al. | |
| 2021/0385716 | A1 | 12/2021 | Bae et al. | |
| 2022/0021605 | A1 | 1/2022 | Bagwell et al. | |

FOREIGN PATENT DOCUMENTS

| | | | |
|---|---|---|---|
| CN | 113852992 | A | 12/2021 |
| KR | 10-2013-0052031 | A | 5/2013 |
| KR | 10-2261172 | B1 | 6/2021 |

OTHER PUBLICATIONS

Accton Technology Corporation, Accton announces the CSP-7551 server-switch appliance with dual 2nd Gen Intel Xeon Scalable processors, Intel Tofino programmable Ethernet switch ASIC, and up to four Intel Stratix 10MX FPGA cards, https://www.accton.com/accton-csp-7551-server-switch-announcement, Dec. 9, 2021.

Cho et al., SMORE: Software-defined networking mobile offloading architecture, All Things Cellular '14: Proceedings of the 4th workshop on All things cellular: operations, applications, & challenges, Aug. 2014.

Shen et al., A Programmable and FPGA-accelerated GTP Offloading Engine for Mobile Edge Computing in 5G Networks, IEEE INFOCOM 2019—IEEE Conference on Computer Communications Workshops, Sep. 2019.

International Search Report and Written Opinion dated Jun. 27, 2023, issued in International Application No. PCT/KR2023/003537.

* cited by examiner

120

COST SERVER UPF

Packet Processing

DEVICE AND METHOD FOR PROCESSING TRAFFIC USING SWITCH

CROSS-REFERENCE TO RELATED APPLICATION(S)

This application is a continuation application, claiming priority under § 365(c), of an International application No. PCT/KR2023/003537, filed on Mar. 16, 2023, which is based on and claims the benefit of a Korean patent application number 10-2022-0056916, filed on May 9, 2022, in the Korean Intellectual Property Office, the disclosure of which is incorporated by reference herein in its entirety.

BACKGROUND

1. Field

The disclosure relates to traffic processing. More particularly, the disclosure relates to a device and a method for traffic processing using a switch.

2. Description of Related Art

Equipment configuring a core network mostly uses a central processing unit (CPU) for packet processing. It is because network equipment checks which user's packet a specific packet is, transfers the specific packet to appropriate equipment for a user's location, or processes the specific packet according to a user's policy and additional functions. The network equipment may perform packet processing based on user's context information and traffic flow information. Recently, a smart network interface card (NIC) has been proposed that partially offloads packet processing functions to hardware, such as a NIC, away from relying solely on a CPU to increase packet processing performance. However, it is almost impossible to offload all packet processing functions, and it is even more difficult in case that an additional function is required when packet processing. Therefore, additional technologies are required to process an explosive increase in large volume of traffic.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and a method for traffic processing using a switch.

Additional aspects will be set forth in part in the description which follows and, in part, will be apparent from the description, or may be learned by practice of the presented embodiments In accordance with an aspect of the disclosure, a method performed by a switch server including a programmable switch and one or more field programmable gate arrays (FPGAs) in a communication system is provided. The method includes receiving information on a flow table from an offloading server, receiving data packets, identifying a FPGA corresponding to the data packets, identifying whether the data packets match a flow entry of the flow table of the FPGA, in case that the data packets match the flow entry of the flow table, processing the data packets based on the flow entry and transmitting the processed data packets, and, in case that the data packets do not match the flow entry of the flow table, providing the data packets to the offloading server.

In accordance with another aspect of the disclosure, a method performed on an offloading server in a communication system is provided. The method includes receiving, from a switch server including a programmable switch and one or more field programmable gate arrays (FPGAs), data packets, processing the data packets, determining whether to generate a flow table for the data packets, in case of a determination that the flow table for the data packets is generated, providing information on the flow table and the processed packets to the switch server, and, in case of a determination that the flow table for the data packets is not generated, providing the processed packets to the switch server without the information on the flow table.

In accordance with another aspect of the disclosure, a switch server in a communication system is provided. The switch server includes a processor, a programmable switch, and one or more field programmable gate arrays (FPGAs). The programmable switch is configured to receive information on a flow table from an offloading server, receive data packets, identify a FPGA corresponding to the data packets, identify whether the data packets match a flow entry of the flow table of the FPGA, in case that the data packets match the flow entry of the flow table, process the data packets based on the flow entry and transmit the processed data packets, and, in case that the data packets do not match the flow entry of the flow table, provide the data packets to the offloading server.

In accordance with another aspect of the disclosure, an offloading server in a communication system is provided. The offloading server includes at least one transceiver, memory storing one or more computer programs, and one or more processors communicatively coupled to the at least one transceiver and the memory, wherein the one or more computer programs include computer-executable instructions that, when executed by the one or more processors individually or collectively, cause the offloading server to receive, from a switch server including a programmable switch and one or more field programmable gate arrays (FPGAs), data packets, process the data packets, determine whether to generate a flow table for the data packets, in case that the flow table for the data packets is generated, provide information on the flow table and the processed packets to the switch server, and, in case that the flow table for the data packets is not generated, provide the processed packets to the switch server without the information on the flow table.

In accordance with another aspect of the present disclosure, one or more non-transitory computer-readable storage media storing one or more computer programs including computer-executable instructions that, when executed by one or more processors of a switch server including a programmable switch and one or more field programmable gate arrays (FPGAs) in a communication system individually or collectively, cause the switch server to perform operations are provided. The operations include receiving information on a flow table from an offloading server, receiving data packets, identifying a FPGA corresponding to the data packets, identifying whether the data packets match a flow entry of the flow table of the FPGA, in case that the data packets match the flow entry of the flow table, processing the data packets based on the flow entry and transmitting the processed data packets, and in case that the data packets do not match the flow entry of the flow table, providing the data packets to the offloading server.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
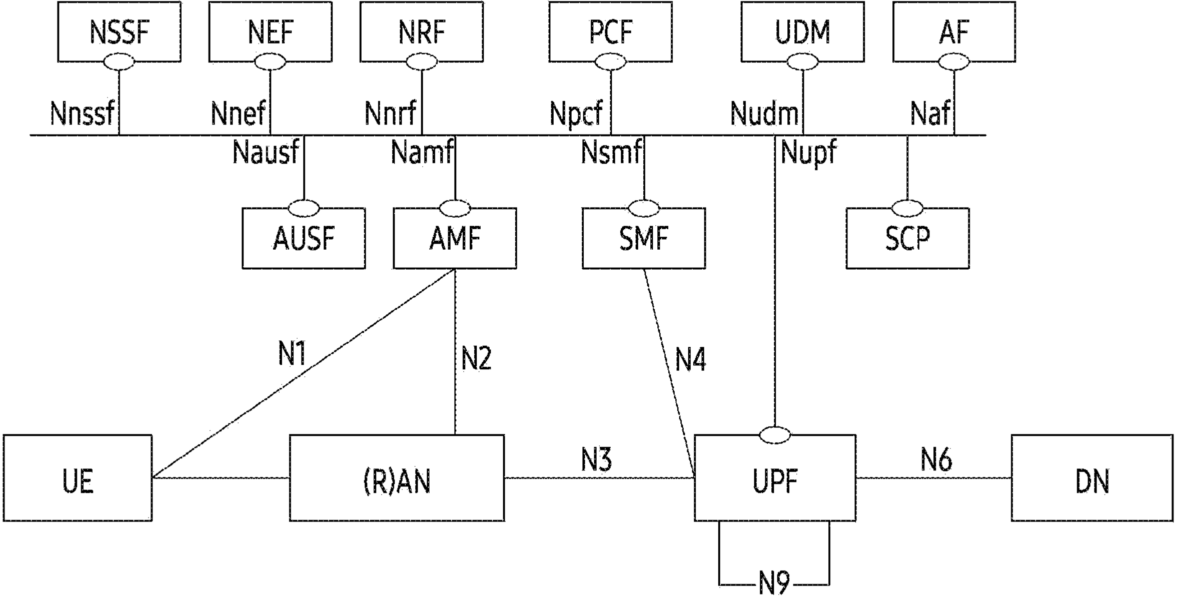
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used herein, including a technical or scientific term, may have the same meaning as those generally understood by those skilled in the art described in the disclosure. Among the terms used in the disclosure, terms defined in a general dictionary may be interpreted in the same or similar meaning as contextual meaning of related technology, and are not interpreted in an ideal or overly formal meaning unless explicitly defined in the disclosure. In some cases, even terms defined in the disclosure may not be interpreted to exclude embodiments of the disclosure.

In various embodiments of the disclosure described below, a hardware approach is described as an example. However, since the various embodiments of the disclosure include a technology using both hardware and software, the various embodiments of the disclosure do not exclude a software-based approach.

A term (e.g., signal, information, message, signaling) referring to a signal, a term (e.g., symbol, slot, subframe, radio frame, subcarrier, resource element (RE), resource block (RB), bandwidth part (BWP), occasion) referring to a resource, a term (e.g., step, operation, procedure) for a calculation status, a term (e.g., packet, user stream, information, bit, symbol, codeword) referring to data, a term referring to a channel, a term referring to network entities, a term referring to a component of a device, and the like used in a following description are exemplified for convenience of explanation. Therefore, the disclosure is not limited to terms described below, and another term having an equivalent technical meaning may be used.

In the disclosure, expressions of 'greater than' or 'less than' may be used to determine whether a specific condition is satisfied or fulfilled, but this is only a description for expressing an example and does not exclude a description of 'greater than or equal to' or 'less than or equal to'. A condition written as 'greater than or equal to' may be replaced with ' greater than', a condition written as 'less than or equal to' may be replaced with 'less than', and a condition written as 'greater than or equal to and less than' may be replaced with 'greater than and less than or equal to'. In addition, hereinafter, 'A' to 'B' refer to at least one of elements from A (including A) to B (including B). Hereinafter, 'C' and/or 'D' refer to at least one of 'C' or 'D', that is, {'C', 'D', and 'C' and 'D'}.

The disclosure describes various embodiments by using terms used in some communication standards (e.g., 3rd generation partnership project (3GPP), extensible radio access network (xRAN), and open-radio access network (O-RAN)), but this is only an example for explanation. Various embodiments of the disclosure may be easily modified and applied in another communication system.

The disclosure provides a device and a method for processing traffic by using a switch server.

The disclosure provides a device and a method for a user plane function (UPF) including the switch server and a commercial off-the-shelf (COTS) server.

The disclosure provides a device and a method for controlling the switch server of the UPF.

The disclosure provides a device and a method for the switch server including a programmable switch and a field programmable gate array (FPGA).

The user plane function (UPF) according to embodiments of the disclosure is capable of efficient network packet processing by offloading a packet through an additional switch server.

The effects that can be obtained from the disclosure are not limited to those described above, and any other effects not mentioned herein will be clearly understood by those having ordinary knowledge in the art to which the disclosure belongs, from the following description.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

FIG. 1A illustrates a wireless communication system according to an embodiment of the disclosure.

Referring to FIG. 1A, a structure of a 5G network wireless communication system is illustrated. A description of a network entity or network nodes configuring the 5G network wireless communication system will be as follows.

A radio (R) access network (AN) may be at least one of an eNode B, a Node B, a base station (BS), a next generation radio access network (NG-RAN), a 5G-access network (5G-AN), a wireless access unit, a base station controller, or a node on the network, as a subject performing radio resource allocation of a terminal. The terminal may include user equipment (UE), next generation UE (NG UE), a mobile station (MS), a cellular phone, a smartphone, a computer, or a multimedia system capable of performing a communication function. In addition, a 5G system is exemplified as a network system for embodiments of the disclosure, but the embodiments of the disclosure may also be applied to another communication system having a similar technical background.

While the wireless communication system is evolving from a 4G system to a 5G system, a next gen core (NG core) network or a 5G core network (5GC), which are new core networks, is defined. The new core network includes a network function (NF) using virtualization of existing network entities (NEs). The NF may perform a function defined by a 3GPP standard or a function according to an external application. According to an embodiment of the disclosure, the network function may refer to a network entity, a network component, and a network resource.

According to an embodiment of the disclosure, the 5GC may include NFs illustrated in FIG. 1A. Of course, it is not limited to an example of FIG. 1A, and the 5GC may include a larger number of NFs or a smaller number of NFs than the NFs illustrated in FIG. 1A.

According to an embodiment of the disclosure, an access and mobility management function (AMF) may be a network function of managing mobility of the terminal based on a network interface (e.g., N1, N2, or Namf).

According to an embodiment of the disclosure, a session management function (SMF) may be a network function of managing a packet data network (PDN) connection providing to the terminal based on a network interface (e.g., N4, or Nsmf). The PDN connection may be referred to as in the name of a protocol data unit (PDU) session.

According to an embodiment of the disclosure, a policy control function (PCF) may be a network function of applying a service policy, a charging policy, and a policy with respect to the PDU session of a mobile communication service provider with respect to the terminal based on a network interface (e.g., Npcf).

According to an embodiment of the disclosure, unified data management (UDM) may be a network function of storing information on a subscriber based on a network interface (e.g., Nudm).

According to an embodiment of the disclosure, a network exposure function (NEF) may be a function of providing information on the terminal to a server outside the 5G network based on a network interface (e.g., Nnef). In addition, the NEF may provide a function of storing in a unified data repository by providing information necessary for a service to the 5G network.

According to an embodiment of the disclosure, a user plane function (UPF) may be a function of performing a gateway role for transferring user data (PDU) to a data network (DN) based on a network interface (e.g., N3, N4, N9, Nupf). In particular, the UPF according to embodiments of the disclosure may be implemented as a switch server and a commercial server (e.g., a commercial off-the-shelf (e.g., COTS) server) for offloading. According to an embodiment, the UPF may be referred to as a hybrid UPF, an offloading UPF, a switching UPF, or a term having technical meaning equivalent thereto.

According to an embodiment of the disclosure, a network repository function (NRF) may perform a function of discovering the NF based on a network interface (e.g., Nnrf).

According to an embodiment of the disclosure, an authentication server function (AUSF) may perform terminal authentication in a 3GPP access network and a non-3GPP access network based on a network interface (e.g., Nausf).

According to an embodiment of the disclosure, a network slice selection function (NSSF) may perform a function of selecting a network slice instance provided to the terminal based on a network interface (e.g., Nnfff).

According to an embodiment of the disclosure, an application function (AF) may provide application functions based on a network interface (e.g., Naf).

According to an embodiment of the disclosure, a service communication proxyy (SCP) may perform proxy communications.

According to an embodiment of the disclosure, the data network (DN) may be a data network in which the terminal transmits and receives data in order to use a network operator's service or a 3rd party service based on a network interface (e.g., N6).

Embodiments of the disclosure relate to network equipment, and relate to a device and a method for implementing offloading with additional hardware in traffic processing. Equipment (e.g., user plane function (UPF), central unit (CU), packet-gateway (P-GW), and serving gateway (S-GW)) of a core network (e.g., evolved packet core (EPC) or 5G core (5GC)) of a communication system mostly uses a central processing unit (CPU) (e.g., x86 CPU) in order to process a packet. In order to increase packet processing capacity, a method of increasing the number of existing CPU-based servers is used. Such a method increases the number of the servers according to traffic processing capacity. Therefore, cost also increases proportionally. In addition, use of many servers may cause increased complexity and operational difficulty, such as ab increase of energy consumption, an increase of space usage, connection and configuration between servers, and the like.

A typical commercial server (e.g., COTS server) is configured with the CPU and a network interface card (NIC) (~200M bit per seconds (bps)). A function of the NIC is fixed. Recently, a smart NIC has been introduced. In the packet processing, the commercial server offloads a portion of packet processing functions to the NIC. For example, the commercial server may be referred to as an offloading server. Although a portion of packet processing capacity increases due to an increase in margin of the CPU, the smart NIC only provides a determined function and few functions for processing packets.

On the other hand, the switch server is configured with the CPU and a large-capacity switch-chip (~12.6 Tbps). The switch server may perform packet processing as desired by a user through a language such as programming protocol-independent packet processors (P4). Herein, the switch-chip may refer to hardware in which a programmable switch is implemented. The switch server alone may configure packet processing equipment such as the commercial server (i.e., COTS server). However, stateful processing in which information on traffic flow is necessary is required when processing a packet, but a current switch-chip is difficult to process a stateful large-capacity packet by the switch server alone due to following three major problems. Herein, the stateful processing means processing in which a server remembers a state of the user (browser), client information, or session information, and then uses the state, the client information or the session information.

1) A Flow Generation/Deletion Processing Performance Issue

The switch-chip should store a state by each flow for the stateful processing. To this end, information for processing by each flow should be transferred from the CPU to the switch-chip. However, since there is a flow information generation/deletion speed limitation due to an interface speed between the CPU and the switch-chip and other limitations, there is a limit to large-capacity stateful flow processing.

2) A Memory Shortage

For the stateful flow processing, the aforementioned stateful information should be stored in the switch-chip, but the current switch-chip on the market has a limitation in stateful processing because it is difficult to store large-capacity flow information due to its small embedded memory size.

3) A Functional Limitation

In the switch-chip, the packet processing is mainly possible through programs as desired by the user in layers a layer 2 (L2) to a layer 4 (L4). Therefore, the switch-chip may function as a traditional firewall, but it is difficult to process information of a layer 7 (L7) (ex, uniform resource locator (URL) filtering) such as web firewall as desired by the user.

Embodiments of the disclosure propose a method for offloading all or some traffic from the CPU to the switch-chip through the large-capacity switch-chip. Embodiments of the disclosure propose a method to achieve minimizing an increase of the number of servers, reducing energy use, minimizing space use, reducing complexity, and reducing cost while dramatically increasing packet processing capacity through the large-capacity switch-chip.

Embodiments of the disclosure propose a network offloading structure and a configuration method using the switch-server and the commercial server (i.e., COTS server), a 5G network application structure and a method using the switch-server, a traffic processing structure and a method between the switch-server and the commercial server, and offloading methods for each traffic. Hereinafter, it is described that a core network entity configuring a mobile communication network performs a packet processing operation for offloading in the disclosure, but embodiments of the disclosure are not limited thereto. Embodiments of the disclosure may be applied not only to network equipment of the mobile communication network, but also to equipment of all packet processing systems.

Figure 1B:
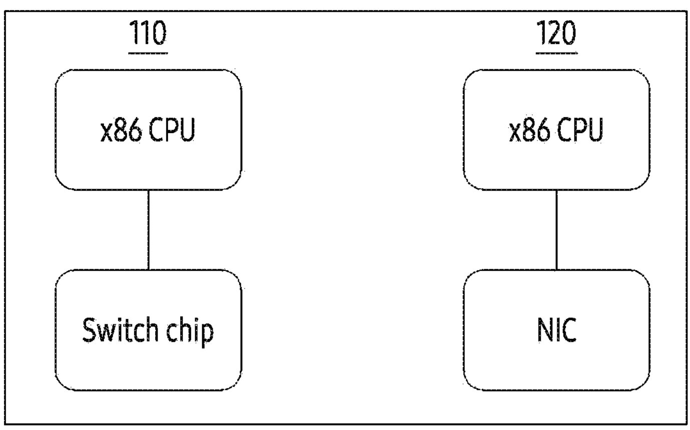
FIG. 1B illustrates a functional configuration of a user plane function (UPF) according to an embodiment of the disclosure.

FIG. 1B illustrates a functional configuration of a user plane function (UPF) according to an embodiment of the disclosure.

Referring to FIG. 1B, an UPF may include a switch-server 110 and a commercial server 120. The switch server 110 may include a CPU (e.g., x86 CPU) and a switch-chip. According to an embodiment, the switch-chip is a large-capacity switch-chip and may offload all or part of traffic. The switch server 110 may process user plane data. The switch server 110 may process data traffic. The switch server 110 may measure and collect usage. The switch server 110 may include a programmable switch. The switch server 110 may include a field programmable gate array (FPGA). The commercial server 120 refers to a COTS server. The commercial server 120 refers to a server in charge of processing existing packets. The commercial server 120 may perform operations of the UPF. The commercial server 120 may include the CPU and a network interface card (NIC). For example, the commercial server may be referred to as an offloading server.

Figure 2:
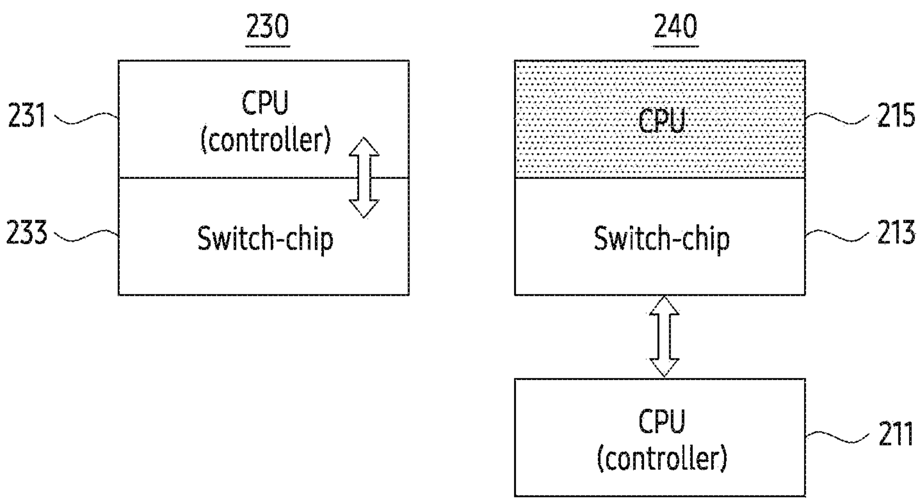
FIG. 2 illustrates an implementation example of a switch-chip of an UPF according to an embodiment of the disclosure.

FIG. 2 illustrates an implementation example of a switch-chip of an UPF according to an embodiment of the disclosure. The switch-chip exemplifies the switch-chip of the switch server 110 illustrated in FIG. 1B.

Referring to FIG. 2, an UPF 230 may be configured in a general implementation method. The UPF 230 may include a CPU 231 performing a controller function and a switch-chip 233. The CPU 231 performing a controller function and the switch-chip 233 may be implemented in one hardware equipment. Meanwhile, an UPF 240 may be configured in a separate-type arrangement method according to embodiments of the disclosure. The UPF 240 may include a CPU 211 performing a controller function and a switch-chip 213. The CPU 211 performing a controller function and the switch-chip 213 may be implemented in separate hardware equipment. Equipment including the CPU 211 performing a controller function may be different from equipment including the switch-chip 213. The equipment including the switch-chip 213 may further include a CPU 215 for driving the switch-chip 213.

According to an embodiment, the equipment including the switch-chip 213 may be the switch server 110 of FIG. 1B. According to an embodiment, the equipment including the CPU 211 performing a controller function may be the commercial server 120 of FIG. 1B. The UPF according to embodiments of the disclosure may use the separate-type arrangement method like the UPF 240. At this time, a controller for controlling the switch-chip 213 may not be newly added, but may be implemented from a server processing existing traffic, that is, the commercial server (e.g., the commercial server 120). Through use of the commercial server, a hybrid UPF according to embodiments of the disclosure may be implemented through modification of the existing server and a connection between the switch-chip and the commercial server. Meanwhile, according to another method, it goes without saying that the controller may be implemented as a new server.

Figure 3:
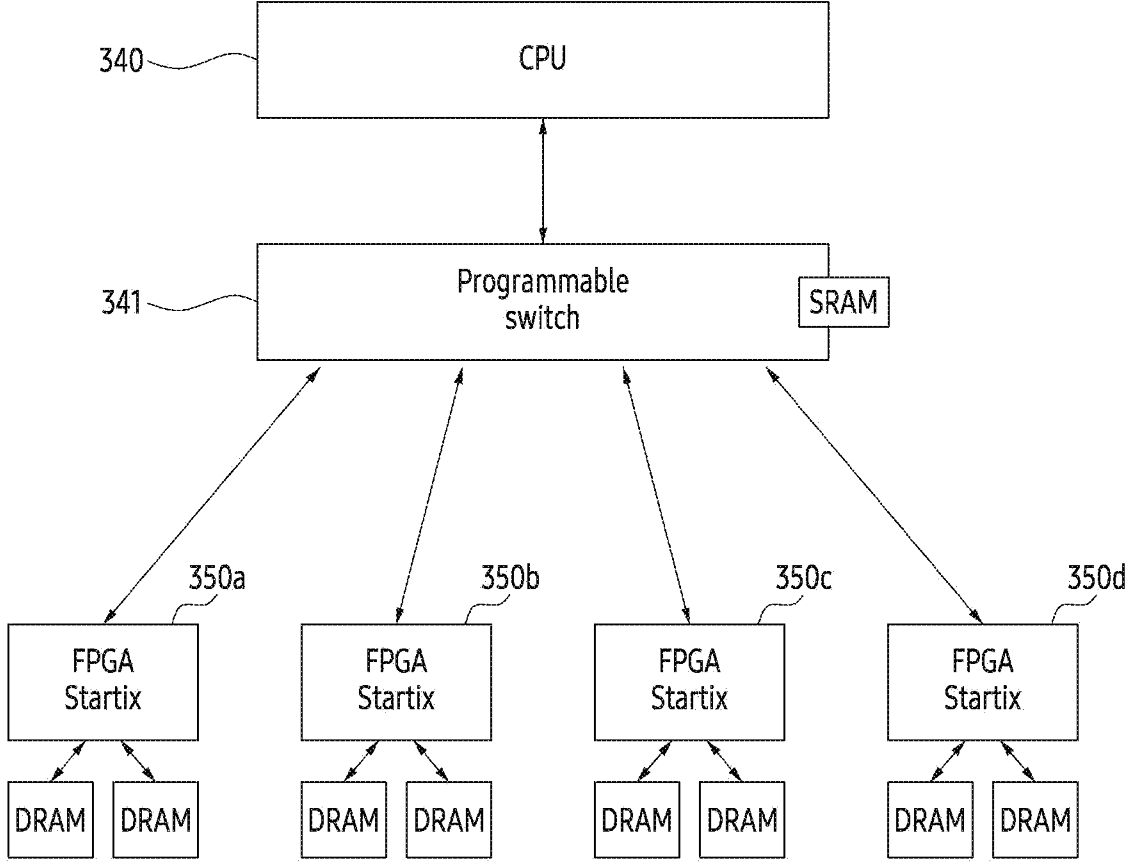
FIG. 3 illustrates an example of a programmable switch and a field programmable gate array (FPGA) of a switch server according to an embodiment of the disclosure.

FIG. 3 illustrates an example of a programmable switch and a field programmable gate array (FPGA) of a switch server according to an embodiment of the disclosure. As described above, a switch is required to store stateful information (e.g., context information on a user, information on traffic flow) for stateful flow processing. Memory mounted inside a general switch is fast, but its size is small, making it difficult to store large-capacity flow information. In order to solve the above-described memory issue, the programmable switch according to embodiments of the disclosure may use the FPGA. Memory capacity may increase through a structure in which a plurality of FPGA memories are coupled to the switch. The switch server may include the programmable switch and the FPGA for offloading implementation of large-capacity of data.

Referring to FIG. 3, a CPU 340 and the switch server may include a programmable switch 341 (i.e., switch-chip), and a plurality of FPGAs (e.g., a first FPGA 350*a*, a second FPGA 350*b*, a third FPGA 350*c*, and a fourth FPGA 350*d*). The programmable switch 341 exemplifies a switch-chip. Hereinafter, unless otherwise defined, a switch is a programmable switch and refers to a large-capacity switch-chip. The programmable switch 341 may include a static random access memory (SRAM).

The FPGA refers to a semiconductor device including a designable logic device and a programmable internal circuit. Since a processor internal circuit is designed directly to fit a program, the FPGA may achieve a much faster calculation speed than the CPU 340 by performing a call and an operation of the program in parallel. Each of the FPGAs may include one or more dynamic random access memories (DRAMs) (e.g., two of the DRAMs). The switch and each of the FPGAs (e.g., the first FPGA 350*a*, the second FPGA 350*b*, the third FPGA 350*c*, and the fourth FPGA 350*d*) may operate organically. Each of the FPGAs may operate with respect to the programmable switch 341 transparently. The switch server according to embodiments of the disclosure may provide extended memory through the switch-chip and the FPGA.

According to an embodiment, the UPF may allocate the FPGA connected to the programmable switch 341 by each slice. For example, the UPF may allocate a first slice to the first FPGA 350*a*. For example, the UPF may allocate a second slice to the second FPGA 350*b*. For example, the UPF may allocate a third slice to the third FPGA 350*c*. For example, the UPF may allocate a fourth slice to the fourth FPGA 350*d*. The UPF may perform an access traffic steering, switching, and splitting (ATSSS) function through the programmable switch 341.

Figure 4:
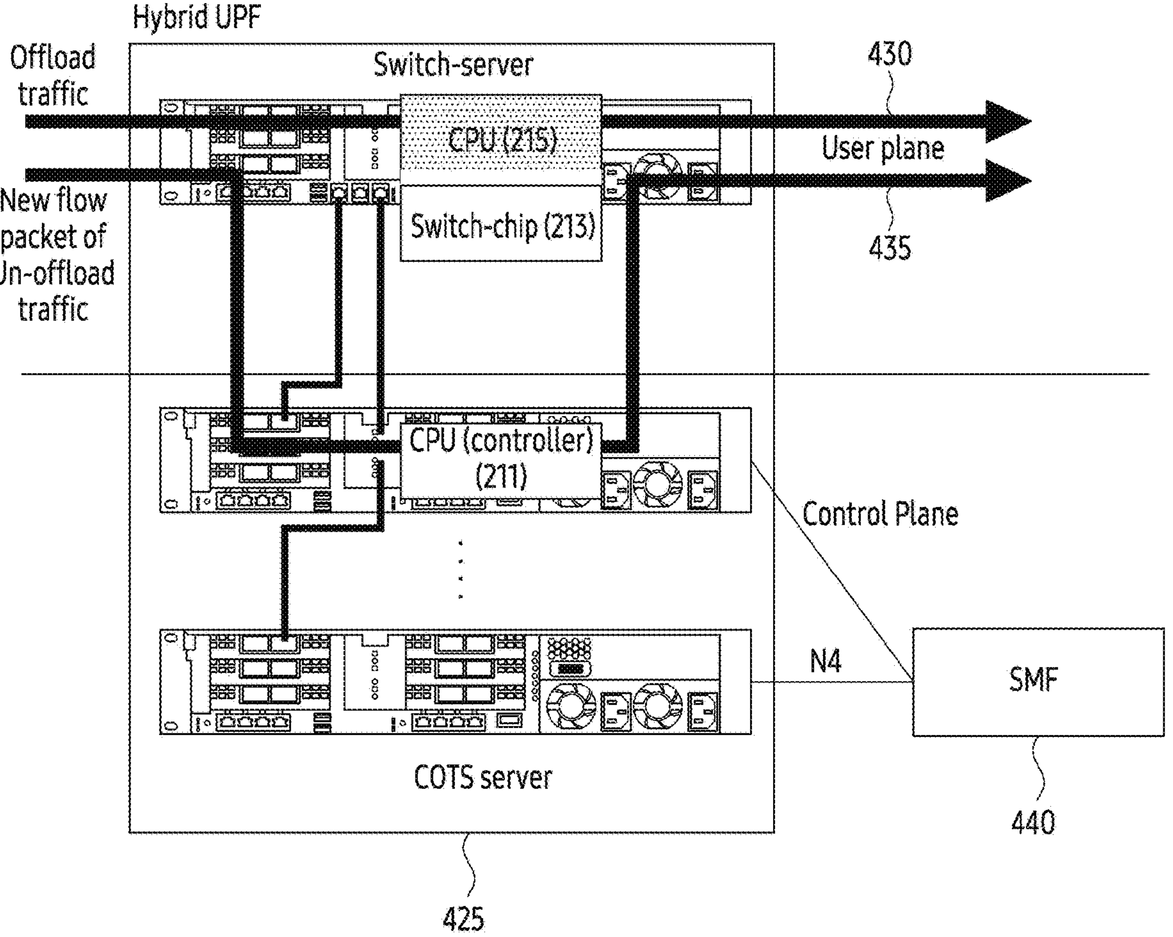
FIG. 4 illustrates an example of adaptive traffic processing of an UPF according to an embodiment of the disclosure.

FIG. 4 illustrates an example of adaptive traffic processing of an UPF according to an embodiment of the disclosure. A method of processing in an existing COTS server without offloading to a switch server is required with respect to a traffic flow of a function incapable of processing in the switch server. In FIG. 4, a 5G network including an UPF implemented through the switch server and the COTS server is illustrated.

Referring to FIG. 4, an UPF 425 may include a switch server and one or more COTS servers. The UPF 425 implemented in the COTS server may be linked with a SMF 440 like the existing 5G network. The UPF 425 may perform a communication with the SMF 440 through an N4 interface. The switch server may be linked with the COTS server. Therefore, logically, the UPF 425 may communicate with other network entities of a 3GPP core network without changing the current 3GPP core network. The two servers (COTS server, and switch server) may operate like one server when viewed from the outside. For example, external control equipment (e.g., the SMF 440) may be connected to only the COTS server in terms of a control plane. Control equipment does not know existence of the switch server. For example, other network equipment is connected to only the switch server in terms of a data plane. The other network equipment does not know existence of the COTS server. In order to operate as one network entity (e.g., the UPF), a switch server 110 may perform a communication with a commercial server 120. The switch server 110 may perform an ethernet communication with the commercial server 120.

Traffic may include at least one of packets of a user plane (or data plane) or packets of the control plane. In the existing 5G UPF, the COTS server processes the received packets in the user plane, based on control plane information (GTP tunnel info, user QoS, packet usage restriction, and the like) received from the SMF. That is, one COTS server processed both the packets of the control plane and the packets of the user plane. However, the UPF 425 according to embodiments of the disclosure has a structure in which the switch server is coupled to the existing COTS server. The COTS server of the UPF 425 may process the packets of the control plane of the UPF. The COTS server of the UPF 425 may perform packets processing with respect to a new unknown flow. The COTS server of the UPF 425 may generate and process a flow entry to the switch server. The switch server of the UPF 425 may process the packets of the user plane with respect to a known flow.

The switch server of the UPF 425 according to embodiments of the disclosure may directly process the received packets according to a determination condition. The received packets may be packets 430 offloaded by the COTS server. The COTS server of the UPF 425 according to embodiments of the disclosure may directly process the packets received from the switch server according to the determination condition, even if it is the same user plane. The received packets may be packets of a new flow or un-offloaded packets 435.

Figure 5A:
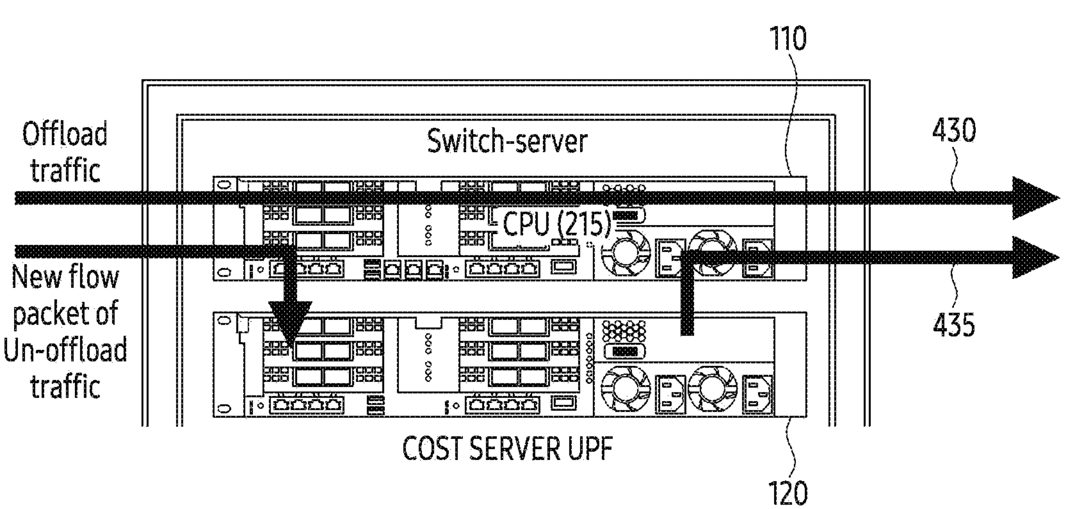
FIG. 5A illustrates an example of traffic processing of an UPF according to an embodiment of the disclosure.

FIG. 5A illustrates an example 500 of traffic processing of an UPF according to an embodiment of the disclosure. A switch server and a COTS server are exemplified as a data center structure.

Referring to FIG. 5A, the switch server may use a top-of-rack (ToR) switch of a server rack because the switch server is programmable, and its capacity is large. A CPU of the switch server may be used as a controller for controlling of the ToR switch. The UPF according to embodiments of the disclosure may perform a ToR switch function. That is, the UPF may replace the ToR switch by utilizing a remaining capacity of the switch server. According to an embodiment, the UPF may support a software-defined network (SDN). The UPF according to embodiments of the disclosure may perform a function of an SDN switch.

Figure 5B:
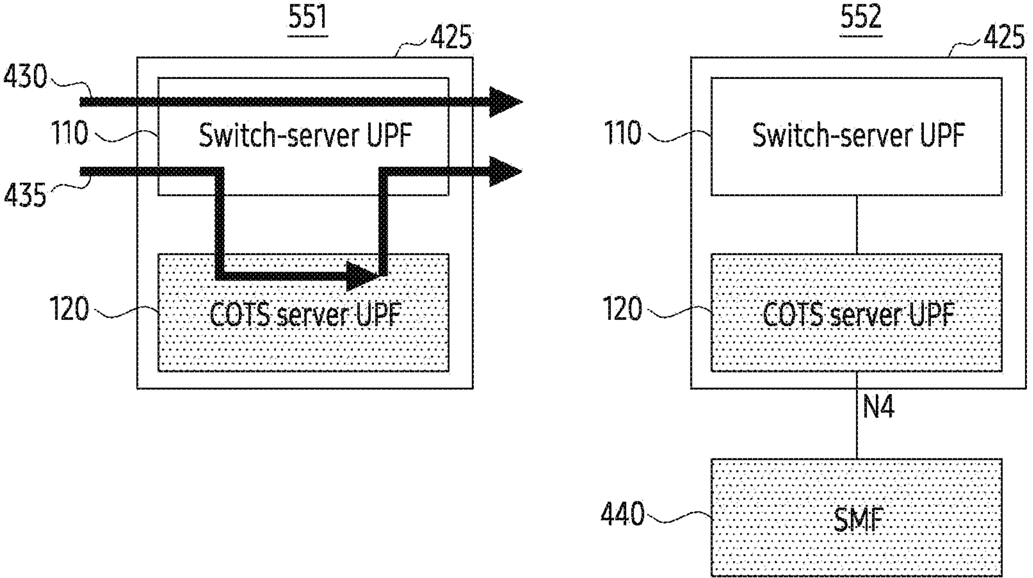
FIG. 5B illustrates an example of processing a user plane and processing a control plane of an UPF according to an embodiment of the disclosure.

FIG. 5B illustrates an example of a processing of a user plane and a control plane of an UPF according to an embodiment of the disclosure. The UPF may include a switch server 110 and a commercial server 120.

Referring to FIG. 5B, processing 551 of a user plane may be performed by the switch server 110 or by the commercial server 120. The switch server 110 may classify the received traffic (packets) on the user plane. The switch server 110 may directly process specific traffic and forward another traffic to a COTS server based on a specified rule. Offloaded packets 430 may be processed by the switch server 110. Packets of a new flow or un-offloaded packets 435 may be performed by the commercial server 120.

According to an embodiment, a user datagram protocol (UDP) traffic may include the offloaded packets 430. The UDP traffic may be processed by the switch server 110. According to an embodiment, transmission control protocol (TCP) traffic may include the packets of the new flow or the un-offloaded packets 435. The TCP traffic may be performed by the commercial server 120.

The processing 551 of the control plane is performed by the COTS server. The COTS server may process packets of the control plane that is handled by an existing UPF. That is, 5G signaling is not changed due to separation implementation of the UPF. An external network entity (e.g., the SMF 440) may perform a communication with the COTS server.

Through FIGS. 1A, 1B, 2, 3, 4, 5A, and 5B, a method of implementing of the UPF using the programmable switch, that is, the switch server including the switch-chip, has been described. Efficient processing of traffic is possible by separating the commercial server in charge of control signaling of the UPF and the switch server. Hereinafter, detailed operations between the commercial server and the switch server for the efficient traffic processing will be described in detail through FIGS. 6, 7A, 7B, 8A, and 8B.

Figure 6:
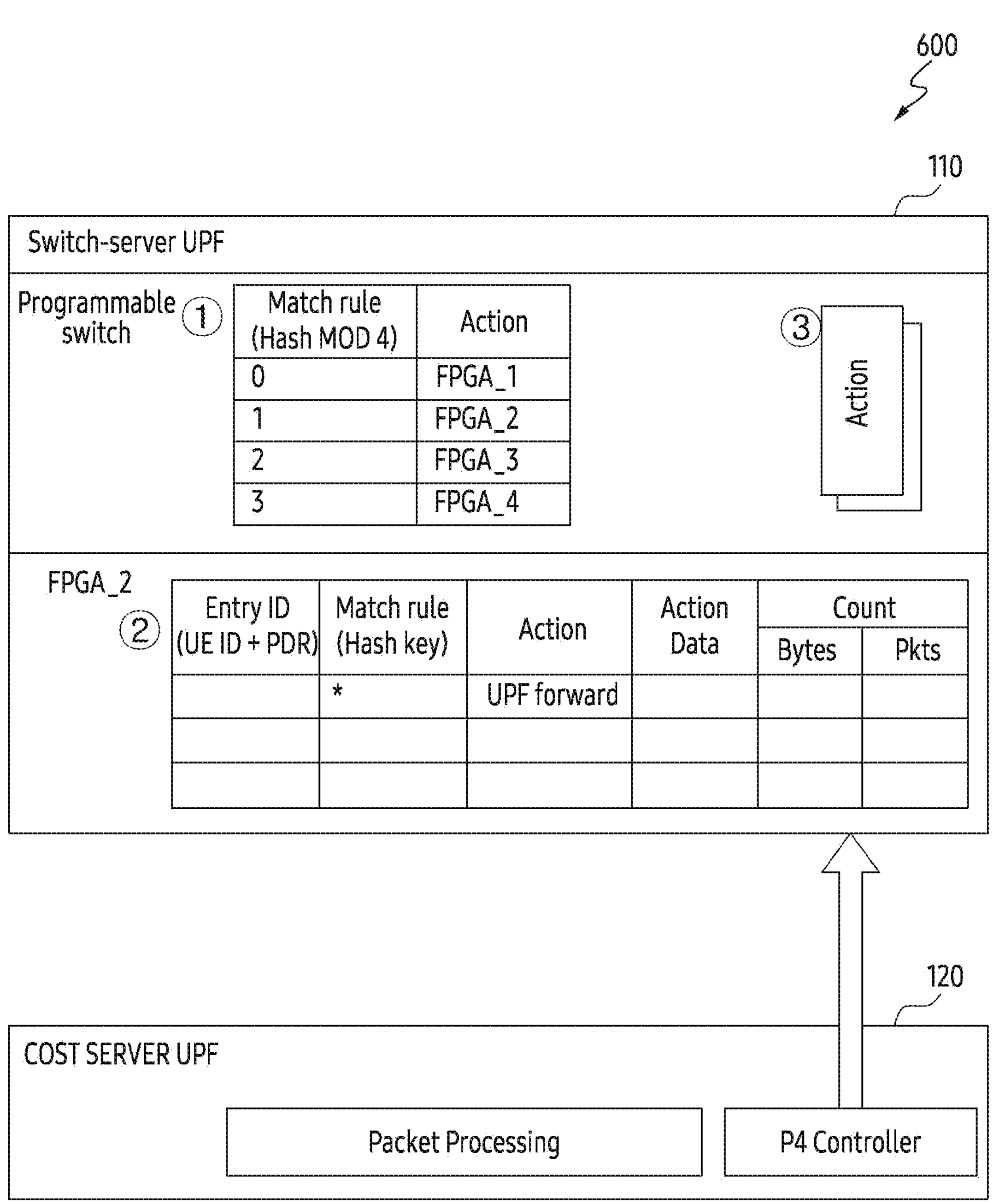
FIG. 6 illustrates an example of an initialization operation of an UPF according to an embodiment of the disclosure.

FIG. 6 illustrates an example 600 of an initialization operation of an UPF according to an embodiment of the disclosure. The UPF may be implemented through two entities. According to an embodiment, a switch server 110 and a commercial server 120 (e.g., COTS server) may be used for the implementation of the UPF. The switch server 110 may include a programmable switch and one or more FPGAs. In FIG. 6, a second FPGA (i.e., FPGA_2) is illustrated, but other FPGAs besides the second FPGA may also be coupled with the programmable switch.

The programmable switch may receive packets. The programmable switch may identify a processing direction of the received packets. The programmable switch may identify the processing direction of the received packets based on a flow table. That is, based on the flow table, the programmable switch may identify whether to process autonomously the packets in the switch server 110, or whether to deliver the packets to the commercial server 120 so that the commercial server 120 may process the packets. In this case, the flow table may be set by the commercial server 120.

Referring to FIG. 6, the commercial server 120 may perform the initialization operation. According to an embodiment, the commercial server 120 may generate information for controlling actions of the switch server 110. The commercial server 120 may set the actions of the switch server 120 based on configuration information. According to an embodiment, the commercial server 120 may set a flow entry and the flow table for processing in the switch server 120. The flow entry refers to a data set including flow information generated or deleted from the flow table in a switch-chip or the FPGA, and information for other processing. The flow table in the switch-chip may be a look-up table that indicates which FPGA the received packets are to be delivered to. The flow table may also be referred to as a forwarding table.

Figure 7A:
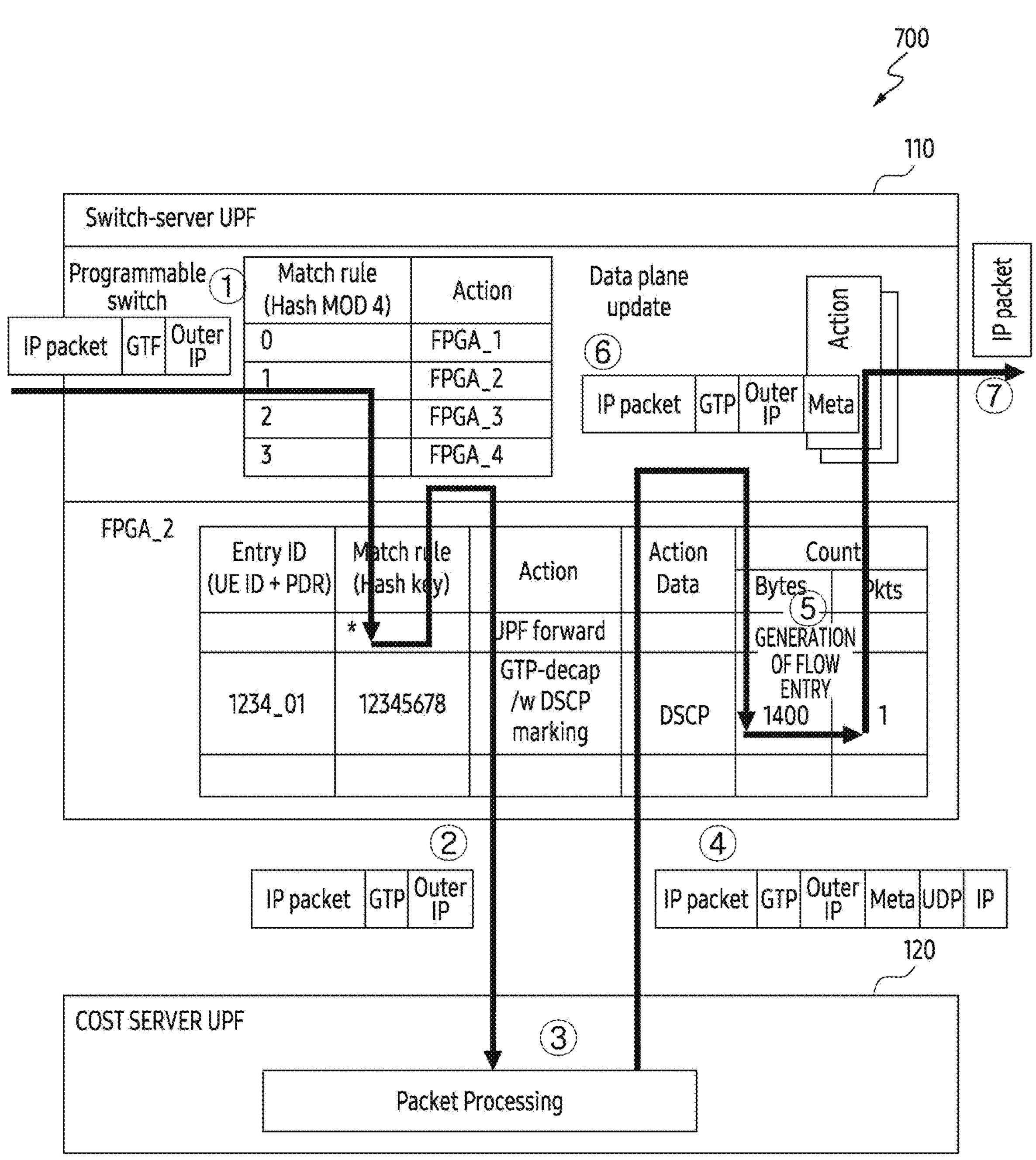
FIGS. 7A and 7B illustrate an example of uplink data processing of an UPF according to various embodiments of the disclosure.
Figure 7B:
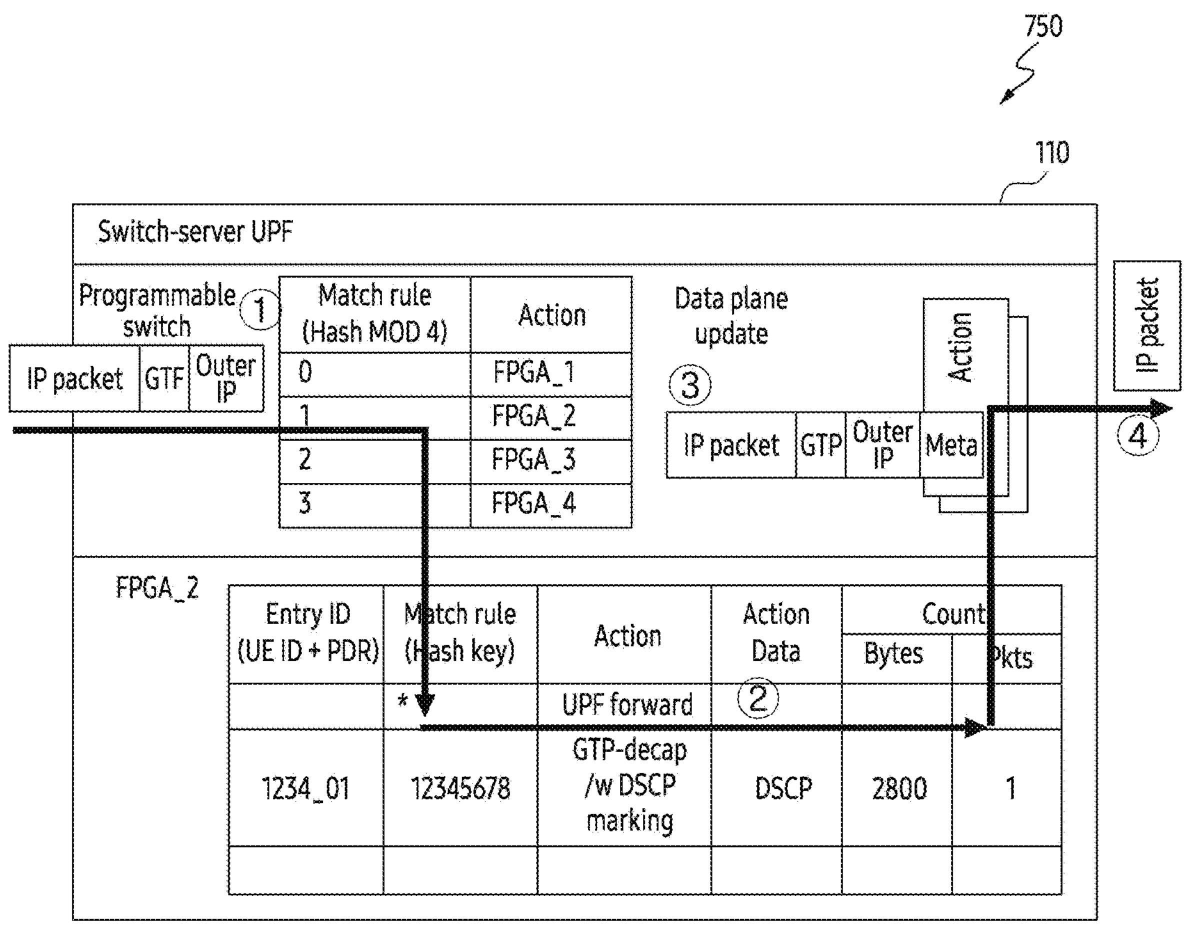

FIGS. 7A and 7B illustrate an example of uplink data processing of an UPF according to various embodiments of the disclosure. According to an embodiment, a switch server 110 and a commercial server 120 (e.g., COTS server) may be used for implementation of the UPF. The switch server 110 may include a programmable switch and one or more FPGAs.

Referring to FIG. 7A, a packet processing operation 700 for a new flow of the switch server 110 and the commercial server 120 is described. Herein, a packet may be uplink data. When a flow entry is generated in the switch server 110, the packet processing operation 700 of FIG. 7A is not performed.

In the first step, the switch server 110 may receive a packet through the programmable switch. The switch server 110 may identify a corresponding FPGA (e.g., FPGA_2) through the switch. The switch server 110 may transfer the received packet to the corresponding FPGA. For example, the received packet may include an IP packet, general packet radio service (GPRS) tunnelling protocol (GTP) header, and an outer internet protocol (IP) header as uplink data.

In the second step, the switch server 110 may identify that the flow entry of the received packet is not in the FPGA. The FPGA may transfer the packet back to the switch. The switch server 110 may transmit the packet to the commercial server 120 through the switch. That is, when a packet without the flow entry arrives at the switch server 110, the switch server 110 searches for the flow entry. If there is no flow entry corresponding to the packet, the switch server 110 may recognize the packet as a new flow packet and transmit the packet to the commercial server 120.

In the third step, the commercial server 120 may process the packet. The commercial server 120 may process the received packet in the same manner as an existing UPF operation. The commercial server 120 may perform flow entry processing and UE context-based packet detection rule (PDR) processing.

In the fourth step, the commercial server 120 may determine whether to perform flow offloading. The commercial server 120 may determine whether to process the packet in the switch server 110. Based on determining to perform flow offloading, the commercial server 120 may add metadata (e.g., differentiated service code point (DSCP) value) for processing in the switch server 110 to the packet. The commercial server 120 views user information on a corresponding packet and then may add meta to the corresponding packet by using an action required for packet processing and a related parameter value (GTP Info, DSCP, QoS information, and the like) as meta. The commercial server 120 may record usage. The commercial server 120 may generate a processed packet by adding some data (e.g., metadata, IP, UDP) to the received packet. The commercial server 120 may transfer the processed packet to the FPGA.

According to an embodiment, the metadata may include an entry ID. The entry ID may be determined based on a UE ID and the PDR. The entry ID may be used for a usage count by each PDR henceforth. According to an embodiment, the metadata may include GTP information. The commercial server 120 may identify and process a tunnel endpoint identifier (TEID) included in a GTP header. The metadata may include a tunnel endpoint ID (TEID). According to an embodiment, the metadata may include a DSCP value. The commercial server 120 may identify and process DSCP. The TEID or the DSCP may be used for packet processing in the FPGA of the switch server 110. On the other hand, unlike illustrated in FIG. 7A, in case of determining that the commercial server 120 does not need to perform the flow offloading yet, the processed packet may be delivered to the switch server 110 without metadata. That is, if flow entry generating and a specific processing for the packet are not necessary, the commercial server 120 may transfer the packet to the switch server 110 and discharge it to egress, without meta information. Since there is no metadata, the flow entry may not be generated in the switch server.

In the fifth step, the switch server 110 may generate a flow entry based on the metadata. The FPGA of the switch server 110 may generate the flow entry based on the metadata. The switch server 110 receiving the packet may generate the flow entry of a corresponding packet based on the meta information.

In the sixth step, the FPGA of the switch server 110 may transfer the packet to the switch. The switch server 110 received the packet may perform packet processing based on the generated entry. The FPGA of the switch server 110 may remove UDP information and IP information. The switch of the switch server 110 may receive a packet from which the UDP information and the IP information are removed.

In the seventh step, the switch server 110 may process a specified action, and then transfer the processed packet to the outside, through the switch. The switch of the switch server 110 may remove the GTP header, the Outer IP header, and the metadata of the packet received from the FPGA of the switch server 110. The switch of the switch server 110 may transfer the IP packet to the outside.

The switch server 110 may offload or directly process the packet through the first step to the seventh step. According to an embodiment, the switch server 110 may directly process the packet from the switch server 110 without transferring the packet to the commercial server 120 even if there is no flow entry, with respect to a packet in which specific L2/L3/L4 conditions are fulfilled. This operation may be determined by a program for the switch-chip of the switch server 110. Hereinafter, URL filtering is described as an example.

The switch server 110 may receive a TCP synchronization (SYN) packet, which is a first packet for an HTTP new flow. The switch server 110 may check that there is no flow entry and transfer the corresponding packet to the commercial server 120. In case that a destination port is 80 or 8080, the commercial server 120 may recognize it as a HyperText Transfer Protocol (HTTP) flow. The commercial server 120 may hold traffic offloading to the switch server 110 for a corresponding flow until it receives an HTTP request packet. This is because the commercial server 120 may determine whether to maintain continuously the corresponding flow or drop the corresponding flow after identifying URL information of the HTTP request packet. Therefore, the commercial server 120 may perform necessary processing (flow entry generation and packet count, and the like) in the commercial server 120 without meta information for the flow entry generation, and then return the processed packet back to the switch server 110, thereby completing packet transmission to the outside.

After the HTTP packet arrives in the switch server 110, the switch server 110 may transfer the corresponding packet back to the commercial server 120 because a corresponding flow entry is still not in the switch server 110. The commercial server 120 may view URL information of an HTTP header after necessary processing, and may determine whether to proceed or block offloading to the switch server 110 by allowing the corresponding traffic flow. If the commercial server 120 allows access of the URL and decides to offload it at the same time, the commercial server 120 may include state information of the flow, an action and action data to be performed in the switch server 110, and the like in the metadata in the HTTP request packet. The commercial server 120 may transmit the metadata to the switch server 110. If it is necessary to block the access of the corresponding URL, the commercial server 120 may drop the corresponding packet. After receiving the corresponding packet, the switch server 110 may generate a flow entry based on the meta information and perform corresponding packet processing. Since there is the flow entry in the switch server 110 with respect to the flow packet received thereafter, the switch server 110 may directly process in the switch server 110 without transmitting to the commercial server 120, thereby performing offloading.

Referring to FIG. 7B, a packet processing operation 750 for registered flow of the switch server 110 and the commercial server 120 is described. Herein, a packet may be uplink data. In a situation in which a flow entry is registered in a switch server 110, the switch server 110 may process the registered packet.

In the first step, the switch server 110 may receive a packet through a programmable switch. The switch server 110 may identify a corresponding FPGA (e.g., FPGA_2) through the switch. The switch server 110 may transfer the received packet to the corresponding FPGA. For example, the received packet may include an IP packet, a GTP header, and an Outer IP header.

In the second step, a FPGA of the switch server 110 may obtain an action and action data information from a flow entry matched to the received packet, and include the obtained action and action data information in metadata.

In the third step, the FPGA of the switch server 110 may generate a processed packet by adding metadata to the packet. The FPGA may transfer the generated packet to the programmable switch.

In the fourth step, the switch of the switch server 110 may process an action indicated by the metadata, and then transfer the processed packet to the outside. According to an embodiment, the switch of the switch server 110 may remove the GPRS tunnelling protocol (GTP) header. According to an embodiment, the switch of the switch server 110 may remove the outer internet protocol (IP) header. According to an embodiment, the switch of the switch server 110 may perform DSCP marking.

If the received packet is a packet existing in the flow entry of the switch server 110, the switch server 110 may transfer the packet to the outside by processing the packet itself, through the first step to the fourth step. As illustrated in FIG. 7B, in case that the switch server 110 processes a packet autonomously, the commercial server 120 is not involved in packet processing. Since the packet is processed only by hardware of the switch-chip without a process that transferring the packet to the commercial server 120 and then returning it to a switch server 1104, a large-capacity packet may be processed at high speed.

Although the processing operation of the uplink packet has been described in FIGS. 7A and 7B, embodiments of the disclosure are not limited thereto. An operating principle of the UPF using the switch server according to embodiments of the disclosure may also be applied for a downlink packet. Hereinafter, a processing operation of the downlink packet will be described through FIGS. 8A and 8B.

Figure 8A:
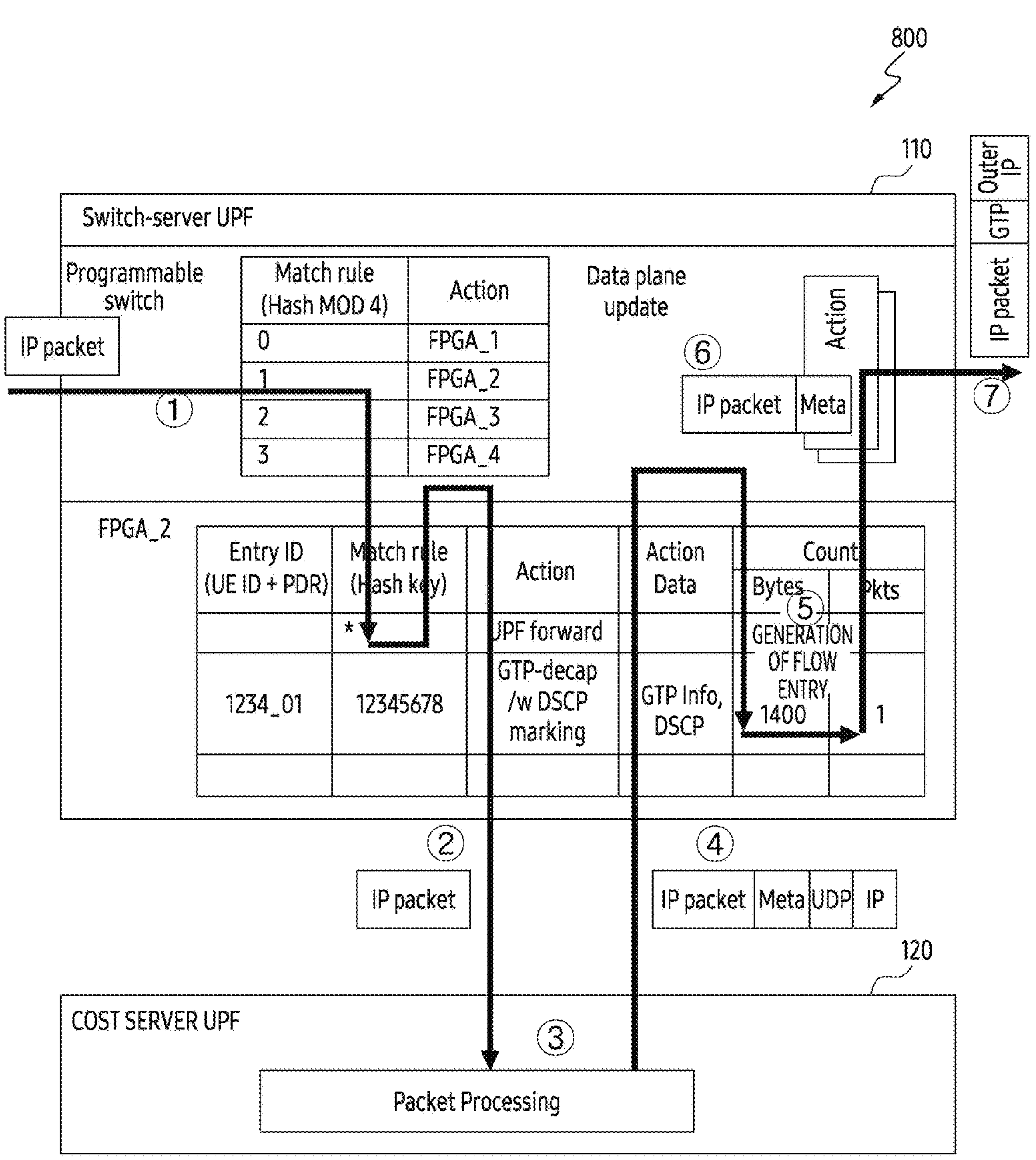
FIGS. 8A and 8B illustrate an example of downlink data processing of an UPF according to various embodiments of the disclosure.
Figure 8B:
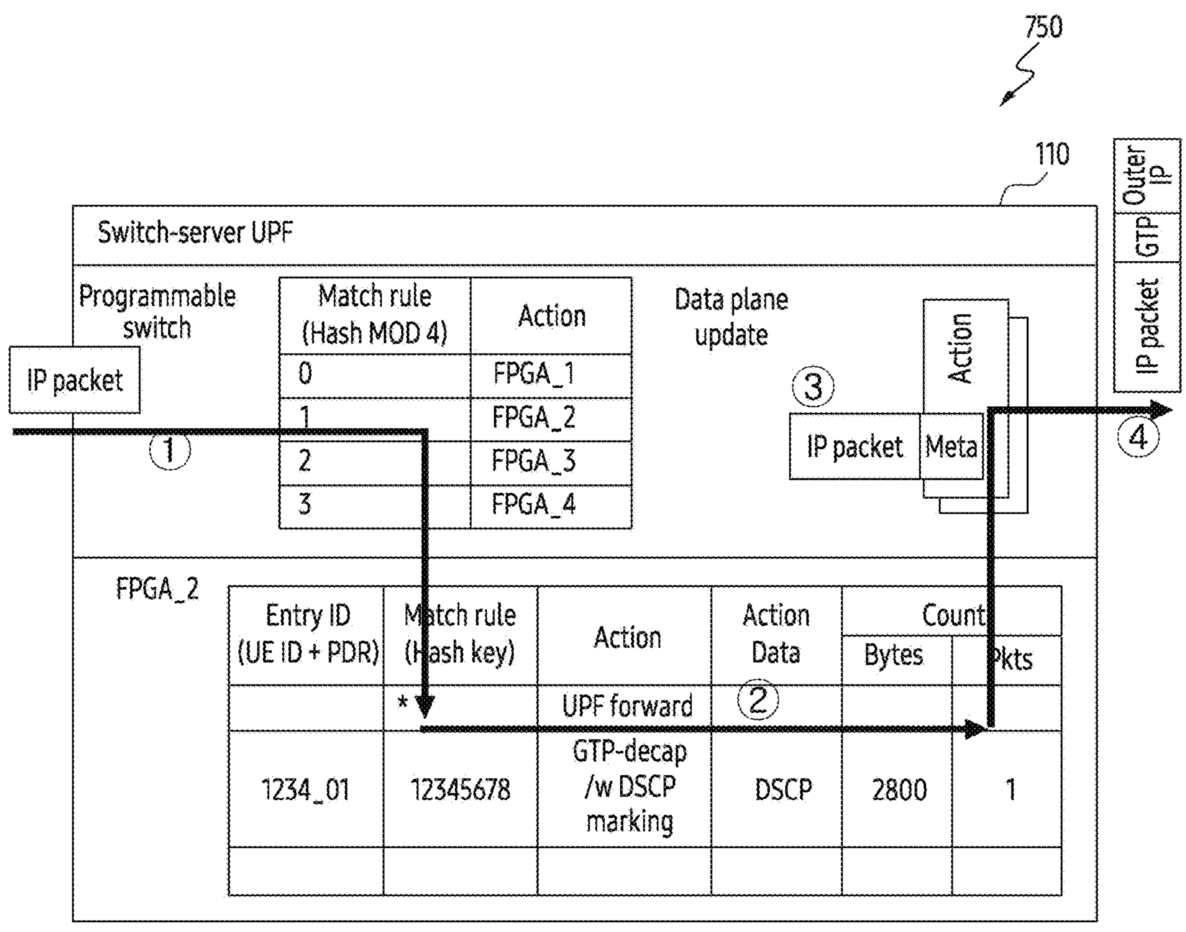

FIGS. 8A and 8B illustrate an example of downlink data processing of an UPF according to various embodiments of the disclosure. According to an embodiment, a switch server 110 and a commercial server 120 (e.g., COTS server) may be used for implementation of the UPF. The switch server 110 may include a programmable switch and one or more FPGAs.

Referring to FIG. 8A, a packet processing operation 800 for a new flow of the switch server 110 and the commercial server 120 is described. Herein, a packet may be downlink data. When a flow entry is generated in the switch server 110, the packet processing operation 800 of FIG. 8A is not performed. The operations mentioned in FIG. 7A may be also applied to FIG. 8A in the same or similar manner.

In the first step, the switch server 110 may receive a packet through the programmable switch. The switch server 110 may identify a corresponding FPGA (e.g., FPGA_2) through a switch. The switch server 110 may transfer the received packet to the corresponding FPGA. For example, the received packet may include an IP packet as downlink data.

In the second step, the switch server 110 may identify that a flow entry of the received packet is not in the FPGA. The FPGA may transfer the packet back to the switch. The switch server 110 may transfer the packet to the commercial server 120 through the switch. That is, when a packet without a flow entry arrives at the switch server 110, the switch server 110 searches for a flow entry. If there is no flow entry corresponding to the packet, the switch server 110 may recognize the packet as a new flow packet, and then transfer the packet to the commercial server 120.

In the third step, the commercial server 120 may process the packet. The commercial server 120 may process the received packet in the same manner as the existing UPF operation. The commercial server 120 may perform UE context-based packet detection rule (PDR) processing, usage reporting rule (UDR) processing, and flow entry processing.

In the fourth step, the commercial server 120 may determine whether to perform flow offloading. The commercial server 120 may determine whether to process the packet in the switch server 110. Based on the determination to perform flow offloading, the commercial server 120 may add metadata (e.g., a differentiated service code point (DSCP) value) for processing in the switch server 110 to the packet. The commercial server 120 may view user information of a corresponding packet, and then add meta to the corresponding packet by using an action required for packet processing and a parameter value (GTP Info, DSCP, QoS information, and the like) related thereto as meta. The commercial server 120 may record usage. The commercial server 120 may generate a processed packet by adding a portion of data (e.g., metadata, IP, UDP) to the received packet. The commercial server 120 may transfer the processed packet to the FPGA.

According to an embodiment, the metadata may include an entry ID. The entry ID may be determined based on the UE ID and the PDR. The entry ID may be used for a usage count per PDR in the future. According to an embodiment, the metadata may include GTP information. The commercial server 120 may add a GTP header and an IP header to the metadata. According to an embodiment, the metadata may include a DSCP value. The commercial server 120 may perform DSCP marking. The commercial server 120 may add the DSCP value to the metadata. The metadata may be used for packet processing in the FPGA of the switch server 110. Meanwhile, unlike FIG. 8A, in case of a determination that flow offloading is not yet required, the commercial server 120 may transfer the processed packet to the switch server 110 without the metadata. That is, when a flow entry generation and a specific processing with respect to the corresponding packet are not desired, the commercial server 120 may transfer the packet to the switch server 110 without the metadata. Since there is no metadata, a flow entry may not be generated in the switch server.

In the fifth step, the switch server 110 may generate a flow entry based on the metadata. The FPGA of the switch server 110 may generate the flow entry based on the metadata. The switch server 110 received the packet may generate a flow entry of the corresponding packet based on the meta information.

In the sixth step, the FPGA of the switch server 110 may transfer the packet to the switch. The switch server 110 received the packet may perform packet processing based on the generated entry. The FPGA of the switch server 110 may remove the UDP information and the IP information. The switch of the switch server 110 may receive a packet from which the UDP information and the IP information have been removed.

In the seventh step, the switch server 110 may transfer a processed packet to the outside through the switch after processing with respect to a specified action. The switch of the switch server 110 may remove metadata for the packet received from the FPGA of the switch server 110, and the switch of the switch server 110 may add the GTP header and an outer IP header to the packet. The switch of the switch server 110 may transfer a packet including the IP packet, the GTP header, and the outer IP header to the outside.

Referring to FIG. 8B, a packet processing operation 750 for a registered flow of the switch server 110 and the commercial server 120 is described. Herein, the packet may be downlink data. In a situation that a flow entry is registered in the switch server 120, the switch server 110 may process a registered packet. The operations mentioned in FIG. 7B may be also applied to FIG. 8B in the same or similar manner.

In the first step, the switch server 110 may receive a packet through the programmable switch. The switch server 110 may identify a corresponding FPGA (e.g., FPGA_2) through a switch. The switch server 110 may transfer the received packet to the corresponding FPGA. For example, the received packet may include an IP packet.

In the second step, the switch server 110 may include an action and action data information in metadata by a flow entry of the received packet.

In the third step, the FPGA of the switch server 110 may generate a processed packet by adding the metadata to the packet. The FPGA may transfer the generated packet to the programmable switch.

In the fourth step, the switch of the switch server 110 may transfer the processed packet to the outside after the processing. According to an embodiment, the switch of the switch server 110 may add a GPRS tunnelling protocol (GTP) header. According to an embodiment, the switch of the switch server 110 may add an outer internet protocol (IP) header. According to an embodiment, the switch of the switch server 110 may perform DSCP marking.

If the received packet is a packet existing in the flow entry of the switch server 110, the switch server 110 may transfer the packet to the outside by processing the packet itself, through the first to fourth steps. As illustrated in FIG. 8B, in case that the switch server 110 processes the packet autonomously, the commercial server 120 is not involved in packet processing. Since the packet is processed only by hardware of a switch-chip without a process of transferring the packet to the commercial server 120 and then returning to the switch server 110, a large-capacity packet may be processed at high speed.

The switch-chip (e.g., the programmable switch 341) of the switch server may include a packet parser. The switch-chip may selectively perform offloading only for traffic desired by an operator based on L2/L3/L4. In addition, the switch server may transfer a packet of a new flow to a COTS server, and the COTS server may perform offloading even for a specific application defined by a user using a deep packet inspection (DPI).

For example, in case of corresponding to a flow that does not exist in the switch server, the packet is transferred to the COTS server first, in a URL filtering function. The COTS server may view URL information of a HTTP of a L7, and then determine whether to allow or not. If the flow is allowable, the switch server may perform a registration procedure of a corresponding flow entry. The COTS server may add meta information to the packet, and then transfer the processed packet to the switch server. The switch server may identify a corresponding meta information. The switch server may generate an appropriate flow entry in the switch-chip based on the meta information. If it is difficult to allow a corresponding URL (i.e., not allow), the COTS server may drop the corresponding packet. In order to not process additionally a packet of another user such as the corresponding URL any longer in the COTS server, the COTS server may register destination IP address information of the URL in the filtering list to the switch server. This filtering list may be provided to the switch server. Henceforth, the switch server may perform filtering from the beginning with respect to a packet going to the corresponding URL.

Figure 9:
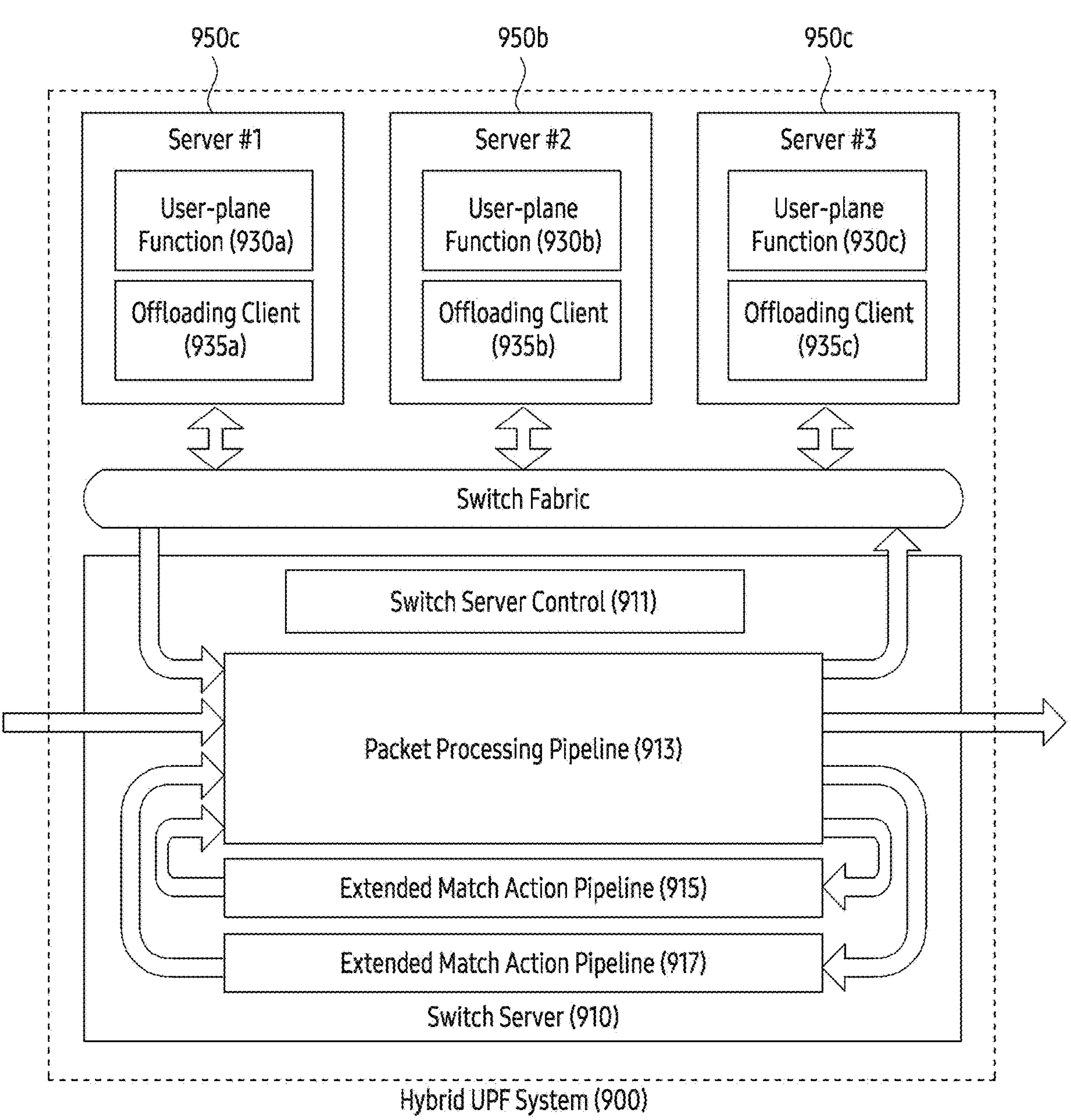
FIG. 9 illustrates an example of a system of an UPF according to an embodiment of the disclosure.

FIG. 9 illustrates an example of a system of an UPF according to an embodiment of the disclosure. An overall configuration of a hybrid UPF system proposed in the disclosure is described.

Referring to FIG. 9, a hybrid UPF system 900 may include one switch server 910 and a plurality of commercial servers (e.g., a first server 950*a*, a second server 950*b*, and a third server 950*c*).

Each server may include an UPF processing unit and an offloading client unit. The first server 950*a* may include a first UPF processing unit 930*a* and a first offloading client unit 935*a*. The second server 950*b* may include a second UPF processing unit 930*b* and a second offloading client unit 935*b*. The third server 950*c* may include a third UPF processing unit 930*c* and a third offloading client unit 935*c*.

In the hybrid UPF system 900, ingress and egress of an external packet are performed in a load balancer and a packet processing pipeline (PPP) 913 that acts as action execution. The PPP 913 transfers an incoming packet according to an operation of a built-in match action pipeline to an extended match action pipeline 915 and 917, or transfer it to an UPF of each server. In order to export the packet processed in the extended match action pipeline or the UPF of a server to the outside, the packet is transferred back to the PPP. The PPP separates and transfers information indicating that it is for external address or discharge, in a discharge direction.

On the other hand, a problem to be solved in the embodiments of the disclosure is a problem that when an excessive packet to be processed in the UPF located in the server flows in, a capacity of the server cannot handle it, which reduces transmission quality, or increases costs by having to deploy a large number of servers. In addition, a method of delegating or offloading (offloading) a packet processing task of a user plane to a switch server 910 is described in order to solve this problem. A burden on the server may be reduced, and as a result, a packet processing capacity may be dramatically expanded compared to legacy scheme.

A processing method according to embodiments of the disclosure may convert an operation for L4 to L7 sessions that are easy to process in the server into an operation for L2 to L3 packet flows (flows) processed in the switch server 910. Since packet processing is delegated to the switch server 910, an operation that is difficult to process in the switch server 910 still remains. A method of canceling the delegation according to a specific condition and allowing the server to process the same again becomes a core of a problem solving proposed by embodiments of the disclosure.

The server may include an offloading client unit to set/control packet delegation (i.e., offloading). The offloading client unit may convert state information for L4 to L7 sessions into state information for L2 to L33 packet flows according to a request of the UPF. The offloading client unit may set a policy of the switch server 910 through a programming interface provided by the switch server 910. In the programming interface in which the switch server 910 provides, there are a method that a control unit 911 of the switch server 910 provides, and a method that a transmission unit (e.g., the packet processing pipeline 913 and the extended match action pipeline 915) of the switch server.

The control unit of the switch server 910, that is, an interface provided by a CPU and a peripheral device thereof, may set a state value of the packet processing pipeline 913, as the CPU compiles a request message of the offloading client unit. Since this process is performed, the above-described method is not suitable for processing in which setting should be updated in real time. On the other hand, since the interface in which the transmission unit of the switch server provides transfer the request message to the packet header, the switch server 910 may add/update/delete a state value indicated by the transmission unit's own operation. The offloading client unit is capable of a mutual communication with the switch server 910 by being implemented to communicate with various types of programming interfaces of such switch servers.

In the disclosure, the L4 to the L7 sessions subject to delegation/offloading correspond to a packet processing function of a user plane session, especially from a perspective of a 5G UPF. For understanding embodiments of the disclosure, an UPF operation of the server is briefly described. When a session for a terminal is established by a SMF in a 5G core network, the SMF set rule information for the session in a specific UPF. This rule information is separated into a packet detection rule (PDR), a forwarding action rule (FAR), a QoS enforcement rule (QER), and a usage reporting rule (URR) according to its use, and then processing operations for these rules are performed sequentially according to specific order, when a packet is received in the UPF. For example, a packet separator (delimiter) (e.g. 5 tuple) is obtained from a header of the packet, and a processing operation is performed according to state information of FAR, QER, and URR, which are three rules for processing in packet discerned as this separator. The FAR stores a state of a rule regarding an operation of transmission according to a destination address of the packet, the QER stores a state of a rule regarding a priority or processing speed of the packet, and the URR stores a state of a rule regarding packet usage and charging.

Meaning of offloading of packet processing means that these three main rules are set in the switch server. Therefore, it means that a packet is processed directly within the switch server without having to be processed by raising it to the server. According to the three rules, the switch server performs modifying a field value of the packet header, adding a new field, and transmitting this changed packet header to the next address along with an original packet body. The switch server enables this operation to be programmed in a manner called a match and an action. Prior to the match operation, parsing is required to extract necessary information and metadata within the header according to the packet's protocol (Ethernet, IPv4, IPv6, UDP, TCP, and the like). A match operation of looking up based on a key generated based on information in the parsed header continues. A key value may be information itself to be compared or may be a summary value made of a hash function to alleviate a limitation of a capacity. The match operation is an operation of determination whether tuple information, such as an IP address and a port of the received packet, system-built-in intrinsic metadata information, or user-defined metadata match a pre-registered key value. When the key is discerned, a value stored in a pair with the key is also discerned. The action operation may include a change operation for a corresponding packet, according to action types and action data corresponding to the discerned value. The action types are forward, drop, header processing, and the like, and header processing includes objects expressing tunneling, marking, encapsulation, fragmentation, and the like. In addition, user customization is also possible in the action types. Therefore, a processing format for external objects (counters, meters, and registers) used as not only basic action data but also the customization may be set to the action types. In addition, a chain of action look-up is possible with the discerned action as a key. The switch server 910 may perform a packet header change procedure for deparsing, based on these discerned action types and targets.

The match action pipeline of the packet processing pipeline 913 is positioned one by one in the ingress and the egress. The match action pipeline may perform immediately deparsing for the egress in the egress through a match-action procedure again by passing without performing the deparsing in the ingress according to an action discerned in the ingress. The key, the action, the action data, and the external objects may be implemented as a table configured of rows and columns.

The switch server 910 is configured of the packet processing pipeline 913, and the extended match action pipelines 915 and 917, and logically, the operation of the above-described Parsing→Match→Action may be performed in common. However, due to a difference in actual implementation, the packet processing pipeline 913 has a small-capacity match action table (MAT), and the extended match action pipeline 915 has a large-capacity MAT. The offloading client unit in the server may program (generate/inquire/modify/delete) the packet processing pipeline 913, and the extended match action pipelines 915 and 917 through signaling through the switch server control unit. Additionally, the extended match action pipelines 915 and 917 provide a function which is capable of programming according to user-defined metadata to the packet itself. The offloading client unit in the server or the packet processing pipeline 913 in the switch sever 910 may transmit by adding a desired user-defined metadata value to a packet transmitted to the extended match action pipelines 915 and 917, based on this programming function. The extended match action pipelines 915 and 917 receiving this packet perform an operation of generation/inquiry/modification/deletion with respect to a field of the MAT possessed through discrimination in the parsing process. On the other hand, the operation of inquiring state information stored in the MAT of the extended match action pipelines 915 and 917 includes an operation of modifying the packet header in order to make a source address sent the request as a destination, and filling and returning a content of a corresponding metadata, when receiving a request to inquire a 'value' of a specific 'key' in the user-defined metadata.

The offloading client unit should appropriately utilize these state generation/inquiry/modification/deletion functions in a MAT Key-Value (KV) column and consistently make a state of L4 to L7 sessions and a state of L2 to L3 packet flows to a necessary level when necessary. Since signaling for a state change becomes excessive in order to match a state of a session and a state of a flow in real time, the disclosure proposes a method of performing the state change when a specific condition is fulfilled. As the UPF determines and requests the offloading client unit, or the offloading client determines by observing an operation result of the UPF, the MAT of the switch server is set by converting the state of the session to the state of the flow. Herein, a technically important requirement is that only one type of state information should be activated at a moment while the session's state information and flow state information are quantitatively coordinated. That is, when the KV column of the flow in the switch server is newly added, the packet immediately inserted is processed in the switch server, and a related state (e.g., counter) is updated. On the other hand, when the flow KV column in the switch server is deleted, the immediately inserted packet is transmitted from the switch to the UPF, and state information for the session in which the UPF deals with is required to be updated based on the most recent information in the flow KV column. To satisfy these requirements, embodiments of the disclosure propose an offloading canceling type with user-defined metadata.

An operation of the switch server 910 according to the offloading cancelling type may include together an operation transmitting a packet that includes a value inquired to the offloading client, which is inquired and required a value of the KV column that indicated by metadata, and an operation of deleting the KV column that the inquiring has completed. Since a difference may occur between an execution time point of the offloading cancelling operation in a switch server unit and a time point at which a session is activated in the UPF through the offloading client, a timer method may be used to compensate for this. According to the timer method, when requesting offloading cancelling with user-defined metadata, the metadata may include timer information. While informing the offloading client of current state information of the KV column and waiting without deleting the KV column, the switch server may inform the offloading client of the last state information once more by deleting the corresponding KV column at a moment the timer expires. The UPF may prepare for session activation during the timer period. Since a timer completion time point held by the UPF will be almost the same as a timer completion time point instructed to the switch server, state information consistency between the session and the flow may be maintained.

Embodiments with respect to a PDR, a FER, a QER, and a URR which are the basic functions of the UPF, and additional functions (HTTP Header Enrichment (HHE), URL/SNI filtering, TCP retransmission packet no-charge), are described under a hybrid UPF system 900 structure described through FIG. 9.

According to an embodiment of UPF basic function offloading, a value such as the 5 tuple used for detection in the PDR or a PDR index value for connection between the PDR and another rule may be set as a key value in the MAT of the switch server. Since the FER, the QER, and the URR correspond to an action for the detected packet, they may be set as a value in the MAT of the switch server.

Since the FER mainly sets a next destination address, the "Forward" type is registered as an action, and the address necessary for it is registered in action data.

The QER is an operation of adjusting a priority of packets according to a condition that a processing speed is more than a certain amount while measuring a processing rate for one session in a bps unit, as a function for bandwidth management. Therefore, it should be set to update usage information for each of one or more flows offloading to the switch server. In this case, since the KV column of the switch server MAT corresponds to one packet flow, the total amount of usage should be obtained by integrating usage state information stored in a plurality of KV columns with respect to one session. Two methods are possible for this operation.

1) A session usage value, which is combined by transferring a usage value per flow, by adding a KV column corresponding to a session and using action→action function, is obtained. The offloading client updates a QER state of a server by inquiring this combined session usage value from the switch server periodically or according to an event.
2) The offloading client periodically inquires about usage information per each flow of the KV column in the switch server, converts it into usage information per each session, and then informs the converted usage information per each session to the UPF.

The UPF obtains a processing speed based on the latest session usage information and updates the QER state as the processing speed value. When a total processing speed is closer to a committed information rate (CIR) according to a session, the UPF requests cancelling of offloading for all flows that have been offloaded for the session and retrieve, and then, monitors whether the CIR is exceeded. When reached to a peak information rate (PIR) beyond the CIR, the UPF readjust the priority of packets according to a rate control policy set in this session. According to another embodiment, a method of decomposing and operating CIR/PIR per each session into CIR/PIR per each flow may be used according to a pre-agreement policy.

The URR is an operation that generates a charging data record for session usage and transmits it to the SMF, while storing an amount of packets processed so far for one session as usage in bits/bytes. Therefore, it should be set to update usage information for each of one or more flows offloaded to the switch server. In this case, since the KV column of the switch server MAT corresponds to one packet flow, it is required to obtain the total usage by integrating usage state information stored in a plurality of KV columns with respect to one session. Two methods are possible for this operation.

1) A session usage value, which is combined by transferring a usage value per flow, by adding a KV column corresponding to a session and using action→action function, is obtained. The offloading client updates the QER state of the server by inquiring the combined session usage value from the switch server periodically or according to an event.
2) The offloading client periodically inquires about usage information per each flow of the KV column in the switch server, converts it into usage information per each session, and then informs the converted usage information per each session to the UPF.

According to one of the two methods, the UPF may update a URR state as latest per-session usage information. When the total usage is closer to the maximum allowed usage according to the session, the UPF requests and retrieve the offloading cancellation for all flows offloaded for the session, and then the UPF generates and reports various CDRs in which the SMF requires by performing the URR operation based on the updated latest usage information.

According to an embodiment of UPF additional function offloading, HTTP header enrichment (HHE) includes adding information (e.g., international mobile subscriber identity (IMSI)) in which an operator desires to a HTTP header of a HTTP request packet. The HHE includes an operation of changing a TCP sequence number of an upstream packet through a fixed rule and changing a TCP acknowledge (ACK) number of a downstream packet through a fixed rule. The offloading client may describe these rules as actions and set them in the switch server. In addition, the offloading client may set IMSI information to be added to the packet header as action data.

According to an embodiment of UPF additional function offloading, uniform resource locator (URL) filtering includes dropping a packet based on the port number (D.port=80/8080) and a URL value of the packet header. When requiring a drop to the offloading client with respect to the discerned session as an initial URL filtering target in the UPF, the offloading client describe a drop rule with respect to a key of a flow included a corresponding session as an action, based on an actual address of the URL to be filtered, and then set the above-described to the switch server.

According to an embodiment of UPF additional function offloading, server name indication (SNI) filtering includes dropping a packet based on the port number (D.port=443), and a URL value of a SNI field of a TSL client hello message. When requiring a drop to the offloading client with respect to the discerned session as an initial SNI filtering target in the UPF, the offloading client describe a drop rule with respect to a key of a flow included a corresponding session as an action, based on an actual address of the URL to be filtered, and then set the above-described to the switch server.

According to an embodiment of UPF additional function offloading, TCP retransmission packet no-charge is a function excluding a packet retransmitted in a mobile communication network by an error from usage for charging. The function needs to be considered only for a downstream packet, because, in case of an upstream packet, it is retransmitted from a terminal and thus may not be known in the UPF. The UPF may activate the TPC retransmission packet no-charge function in the switch server through the offloading client. The offloading client may action-set a logic for the function. According to the logic, the UPF may store the sequence number of the received packet as 'the last sequence value', determine whether the sequence is continuous when the next packet of the same key is received, and then, in case that the sequence is continuous, update 'the last sequence value' to the received packet sequence. In case that the sequence is not continuous, the UPF keep 'the last sequence value' as it is. If the sequence is not continuous, the UPF includes additionally both 'the last sequence value' information and the sequence value of the packet that has just been received and used for judgment, and then transmits it as user-defined metadata toward the offloading client. The offloading client received this metadata may update entire information on a sequential receiving state of the packet sequence number and the number of retransmissions for a specific sequence, based on the two values. The UPF determines charging information based on this entire information.

Figure 10:
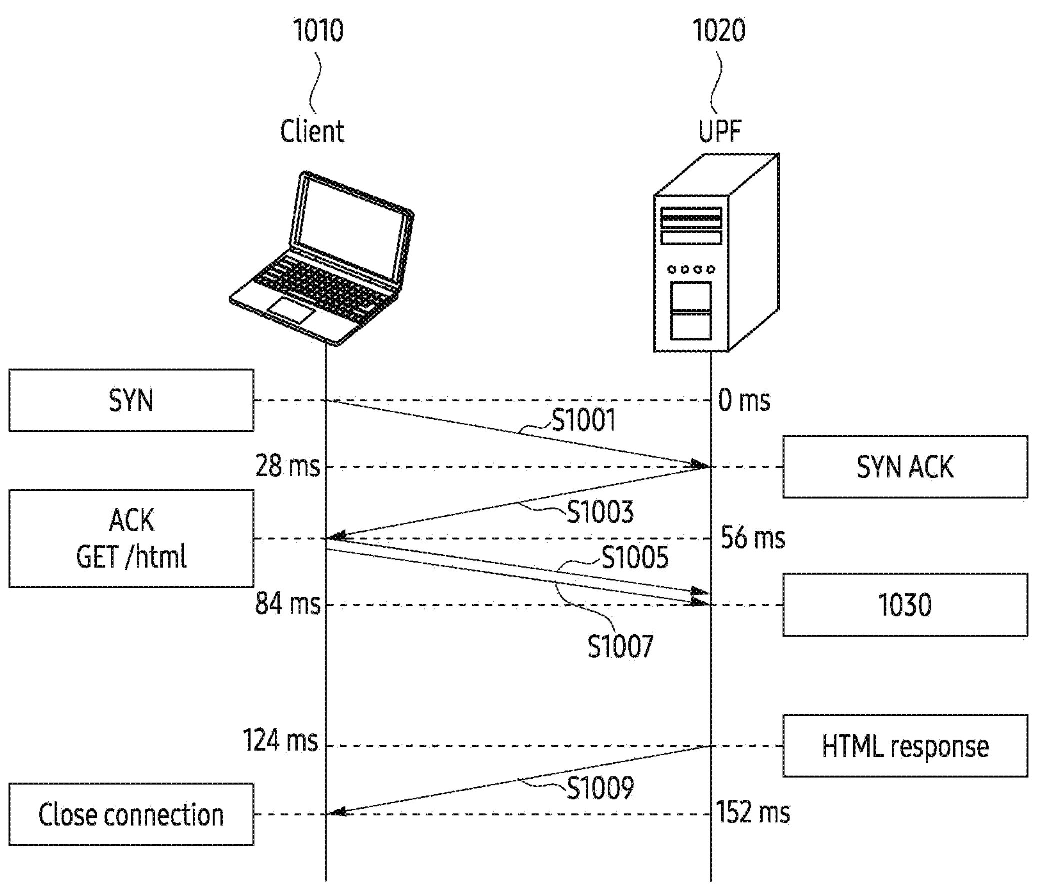
FIG. 10 illustrates an example of signaling for generating a flow table of an UPF according to an embodiment of the disclosure.

FIG. 10 illustrates an example of signaling for generating a flow table of an UPF according to an embodiment of the disclosure. Signaling between a client device 1010 and an UPF 1020 is described. The UPF 1020 may be a hybrid UPF including a switch server according to embodiments of the disclosure. An embodiment of new packet processing (i.e., in case that a flow of a corresponding packet does not exist in a flow entry) may include generating the flow table.

Referring to FIG. 10, in operation 81001, the client device 1010 may transmit a synchronization packet to the UPF 1020. The synchronization packet may be a TCP SYN. In case that a destination port of an initial packet (i.e., the TPC SYN) is 80/8080, a CPU of the UPF 1020 may perform PDR/FAR/URR/QER processing of the UPF. In this case, a switch (e.g., the programmable switch 341 of FIG. 3) of the UPF 1020 may not generate a flow table for packet processing.

In operation S1003, the UPF 1020 may transmit confirmation of the synchronization packet to the client device 1010. The confirmation of the synchronization packet may be a TCP SYN ACK.

In operation S1005, the client device 1010 may receive a HTTP request packet from the UPF 1020. In operation S1007, the client device 1010 may receive a next HTTP request packet 1030 from the UPF 1020. The UPF 1020 may receive the HTTP request packet.

According to an embodiment, the UPF 1020 may determine whether to generate a flow table based on the HTTP request packet. The UPF 1020 may generate a flow table for a passing flow through a matching operation with a URL filter. The UPF 1020 may not generate a flow table for a blocked flow through the matching operation with the URL filter. In case of a flow to be blocked, the flow table for the switch is not generated and is excluded from charging. The switch of the UPF 1020 may receive a packet. The switch may generate a 5-tuple hash key based on an IP packet. The switch may identify a corresponding FPGA, based on a key value. For example, in case that four FPGAs are connected to the switch, the switch may determine which FPGA to send the packet to, through a modulo (MOD) 4 calculation. The switch of the UPF 1020 may transfer the packet to the identified FPGA. The FPGA may transfer the packet of a blocking flow to the CPU of a COTS server of the UPF 1020. The CPU of the UPF 1020 may perform PDR/FAR/QER/count processing, GTP decapsulation, or DSCP marking of an existing UPF. The UPF 1020 may transmit a processed packet to a data network of a data network name (DNN).

In operation S1009, the UPF 1020 may transmit a response with respect to the HTTP request to the client device 1010.

Meanwhile, operation S1005 and operation S1007 are illustrated together, in order to describe an operation corresponding to an individual HTTP request, but FIG. 10 is not understood as limiting embodiments of the disclosure. The HTTP request may be transmitted only once or may be transmitted multiple times.

In the above-described embodiments, a method in which the switch server offloads a packet that has been processed in the COTS server of UPF, and the switch server directly processes the packet has been described, according to a determination condition. According to an embodiment, the determination condition may include packet forwarding of a packet flow of a lower layer (e.g., L2 to L3) according to a result of packet processing of an upper layer (e.g., L4 to L7), and generation of a QoS policy rule. According to an embodiment, the determination condition may include obtaining a state of the packet flow of the lower layer (e.g., L2 to L3) from a state of a session of the upper layer (e.g., L4 to L7). According to an embodiment, the determination condition may include completion of a security processing operation of the session of the upper layer (e.g., L4 to L7). According to an embodiment, the determination condition may include completion of a charging processing operation of the session of the upper layer (e.g., L4 to L7). According to an embodiment, the determination condition may include a change in states of packets of one or more lower layer (e.g., L2 to L3) belonging to a corresponding session according to a change in the state of the session of the upper layer (e.g., L4 to L7). According to an embodiment, the determination condition may include completion of an operation that aggregating and determining states of packet flows of a plurality of lower layers (e.g., L2 to L3). According to an embodiment, the determination condition may include completion of offloading timer setting of the packet flow of the lower layer (e.g., L2 to L3). According to an embodiment, the determination condition may include determination of generation/renewal of the packet flows of the lower layers (e.g., L2 to L3) to be offloaded by other functions of the UPF server.

In the above-described embodiments, a method is described in which the COTS server processes directly, instead of offloading and processing in the switch server according to the determination condition. According to an embodiment, the determination condition may include that a match for a packet of an ingested lower layer (e.g., L2 to L3) will fail. According to an embodiment, the determination condition may include that a destination of the packet of the lower layer (e.g., L2 to L3) will be the inside of the UPF server (e.g., a specific pod). According to an embodiment, the determination condition may include that the packet forwarding and the QoS policy for the packet flow of the lower layer (e.g., L2 to L3) will expire. According to an embodiment, the determination condition may include that security processing of a session of the upper layer (e.g., L4 to L7) will be required. According to an embodiment, the determination condition may include that charging of the session of the upper layer (e.g., L4 to L7) will be required. According to an embodiment, the determination condition may include that state information of the packet flow of the lower layer (e.g., L2 to L3) will satisfy a given condition. According to an embodiment, the determination condition may include ending/pausing of offloading for packet flows of lower layer (e.g., L2 to L3), by other functions of other UPF server.

Even besides the above-described examples, the determination condition may be at least one of the above-described examples or a combination thereof. In addition, the determination condition may include a condition changed through the same or similar technical principle from the above-described examples.

Figure 11:
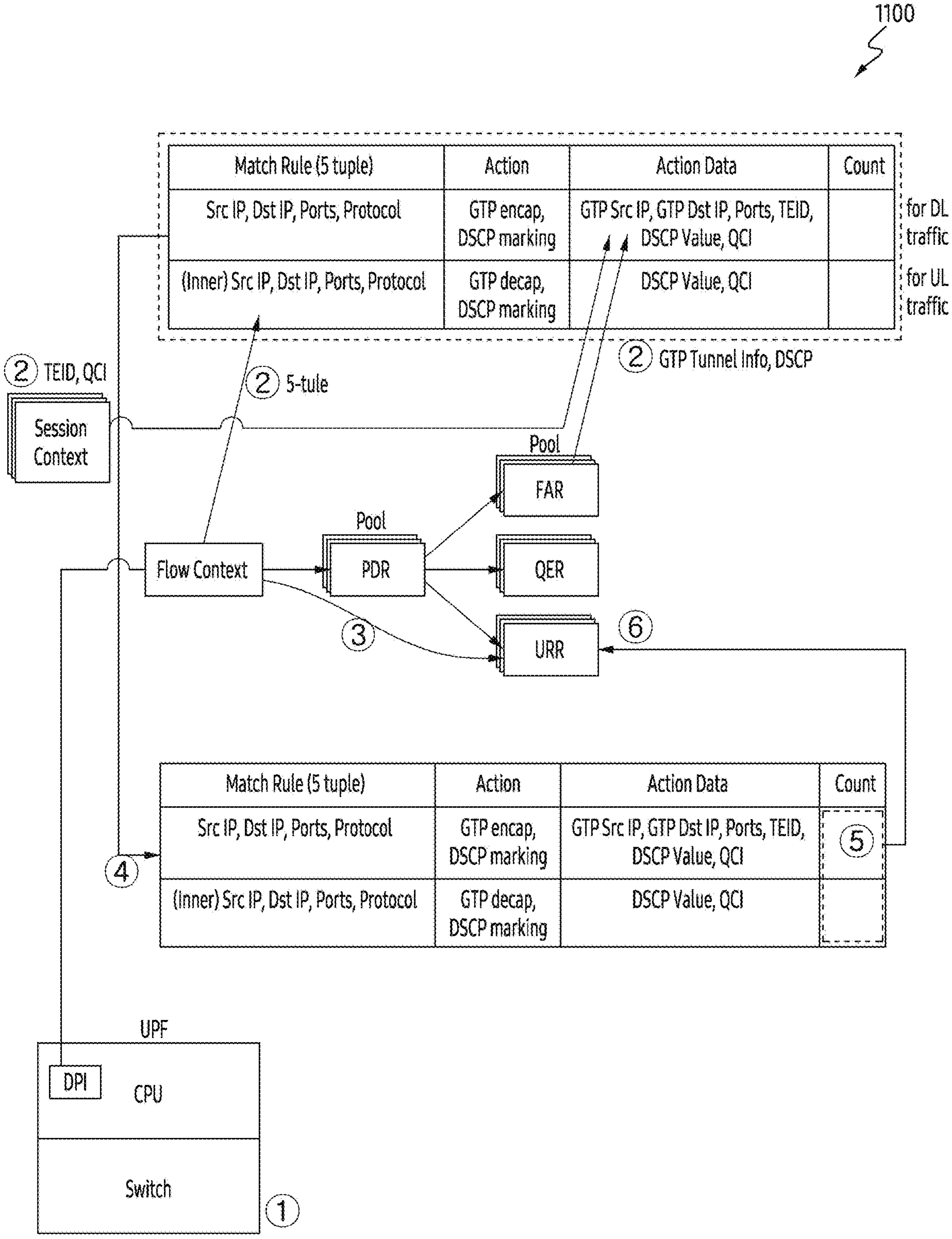
FIG. 11 illustrates an example of new packet processing of an UPF according to an embodiment of the disclosure.

FIG. 11 illustrates an example 1100 of processing a new packet of an UPF according to an embodiment of the disclosure.

Referring to FIG. 11, an embodiment of processing the new packet is described. If a packet is received, a programmable switch of the UPF may determine whether a table exists. If the table for the packet is not checked, the programmable switch of the UPF may transfer the packet to a CPU. Herein, the CPU may refer to a CPU including a controller of the UPF. The CPU may perform deep packet inspection (DPI). The CPU may process a context of a packet flow. The CPU may extract only packet processing information (GTP IP, TEID, DSCP, QER required, and the like) of a corresponding flow. The CPU may generate a new flow entry in a form of a match-action table (MAT) to be used in the programmable switch. The flow table may include information necessary for packet processing, such as a session, a flow, a GTP, QoS class identifier (QCI) information, and the like. According to an embodiment, a TEID may be used as a match rule for a UL packet.

The CPU may record directly charging and usage for a first packet. The CPU may set the generated flow entry to the programmable switch. The CPU may add a MAT to the programmable switch through P4Runtime or a barefoot runtime interface (BRI). The CPU table and the table of the programmable switch may be synchronized. Thereafter, when the programmable switch receives the packet, the programmable switch may process the packet. The programmable switch may record a packet count/meter for the processed packet in the flow entry. The CPU may periodically request count/meter information of the flow entry including a UE IP. The CPU may calculate a final value by combining the received information with first packet information. For example, CounterData P4Runtime message or BRI's bf_switch_counter_get API may be used.

The CPU of the UPF is a controller, and may use memory structure of the current UPF as it is. The CPU may additionally generate a match-action flow entry for a switch-chip. The CPU may perform charging and usage processing for a packet. The programmable switch of the UPF may perform GTP capsulation. The programmable switch of the UPF may perform GTP decapsulation. The programmable switch of the UPF may perform DSCP marking. The programmable switch of the UPF may perform packet measurement (e.g., packet count/meter).

Figure 12:
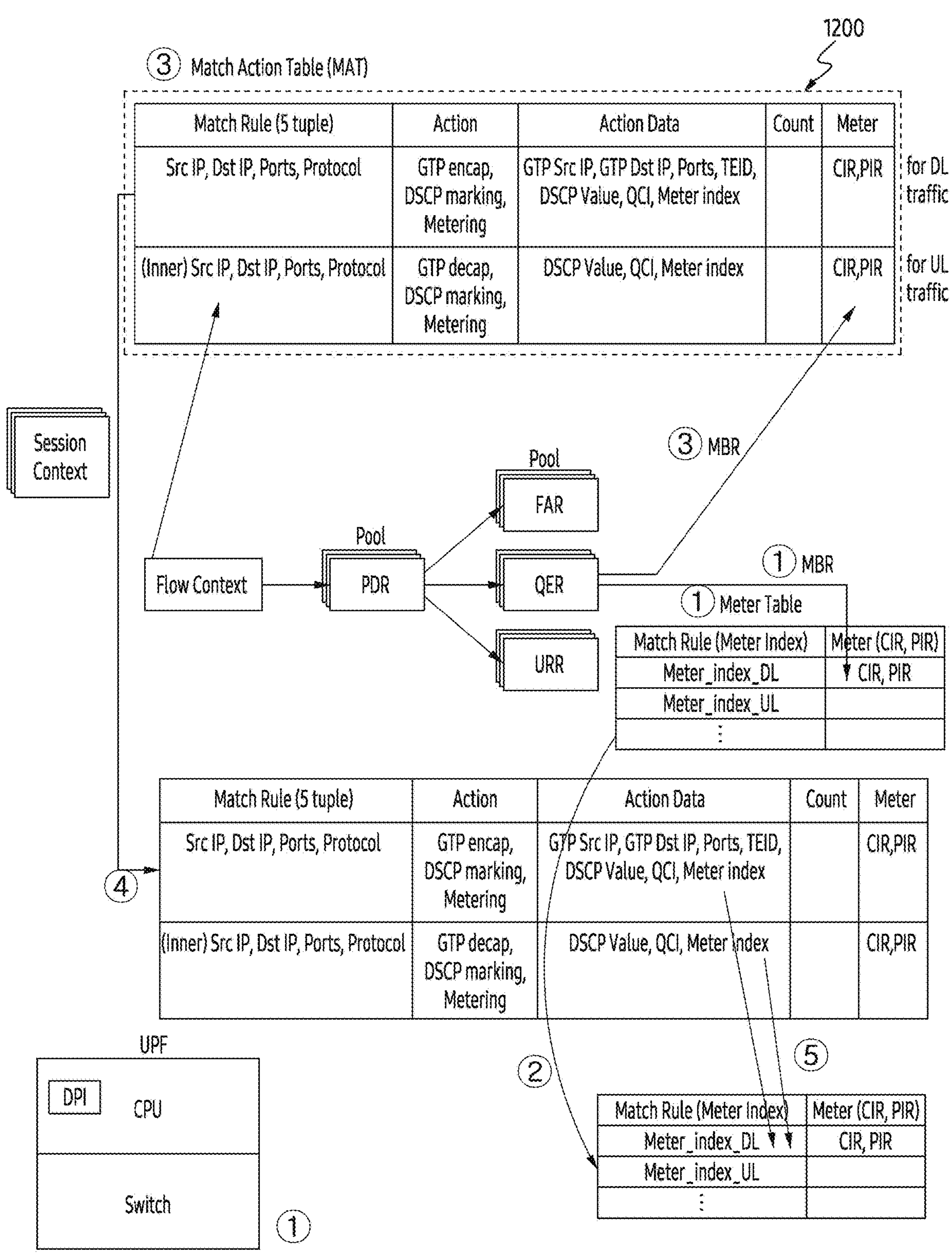
FIG. 12 illustrates an example of a quality of service (QoS) enforcement rule (QER) processing of an UPF according to an embodiment of the disclosure.

FIG. 12 illustrates an example 1200 of a quality of service (QoS) enforcement rule (QER) processing of an UPF according to an embodiment of the disclosure.

Referring to FIG. 12, if a new UE is connected to a network (i.e., UE attach), a QoS per each UE may be added to a meter table. A meter index per each UE may be used for QoS mapping. A CPU may configure a generated table to a programmable switch of the UPF. For example, the CPU may add the generated table to a programmable switch though P4Runtime. As for a per-flow QoS, when a new flow packet is received, the CPU may generate a flow table. At this time, the CPU may perform QoS setting by referring to the QER. The CPU may set the QoS based on the meter index per each UE in action data. The CPU may set a generated MAT entry and a meter flow entry in a programmable switch. For example, the CPU may add the generated MAT entry and the meter flow entry to the programmable switch using a P4Runtime or a Barefoot Runtime Interface (BRI). The programmable switch may perform packet and QoS processing at a flow level first, and then perform QoS processing per each UE by referring to the meter table. That is, the programmable switch may perform pipeline processing.

According to an embodiment of the disclosure, a switch server of the UPF may distinguish a UDP flow from a TCP flow. Hereinafter, a method of processing a UDP flow and a TCP flow will be described with reference to FIGS. 13A, 13B, and 14.

Figure 13A:
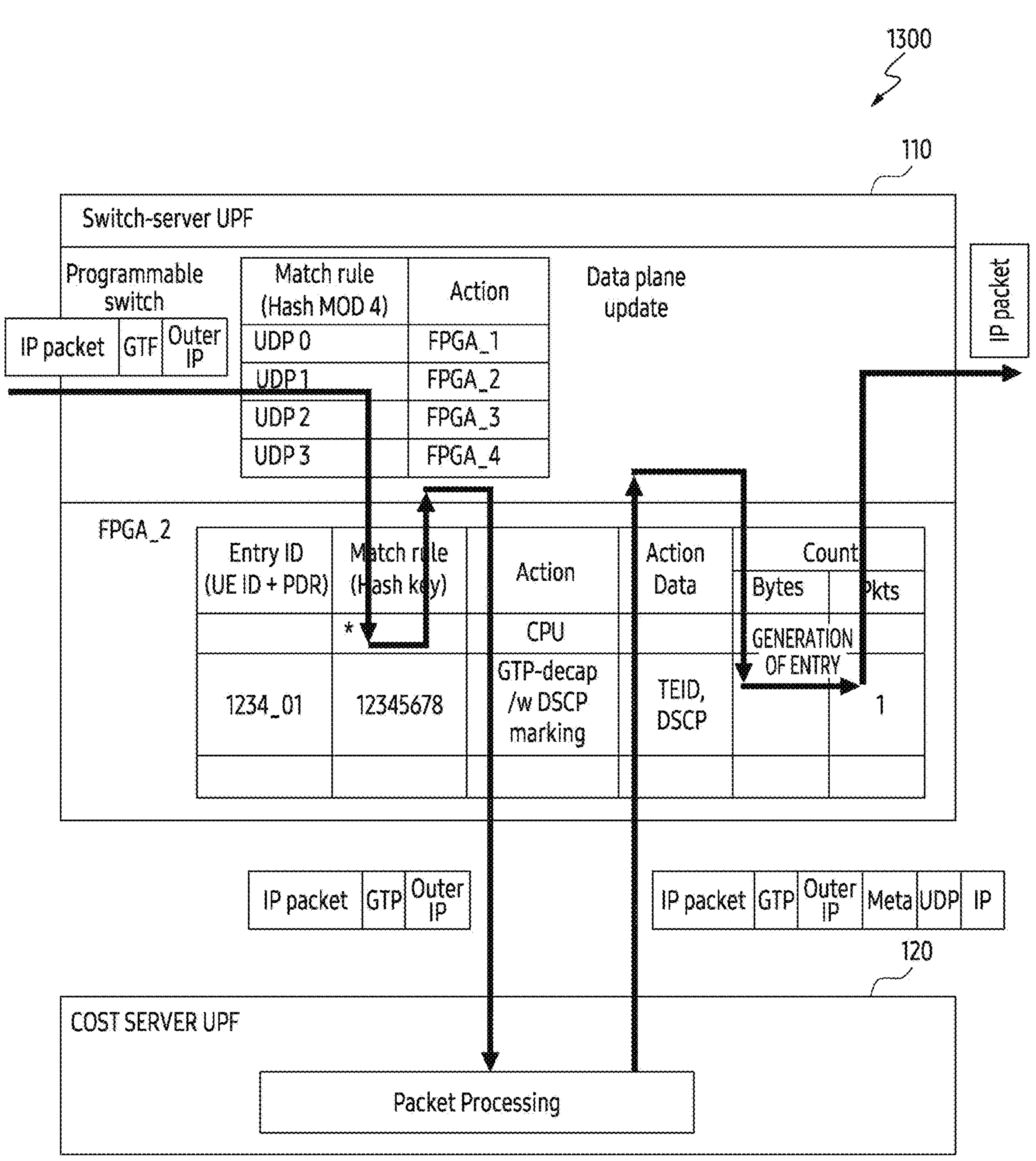
FIGS. 13A and 13B illustrate an example of user datagram protocol (UDP) processing of an UPF according to various embodiments of the disclosure.
Figure 13B:
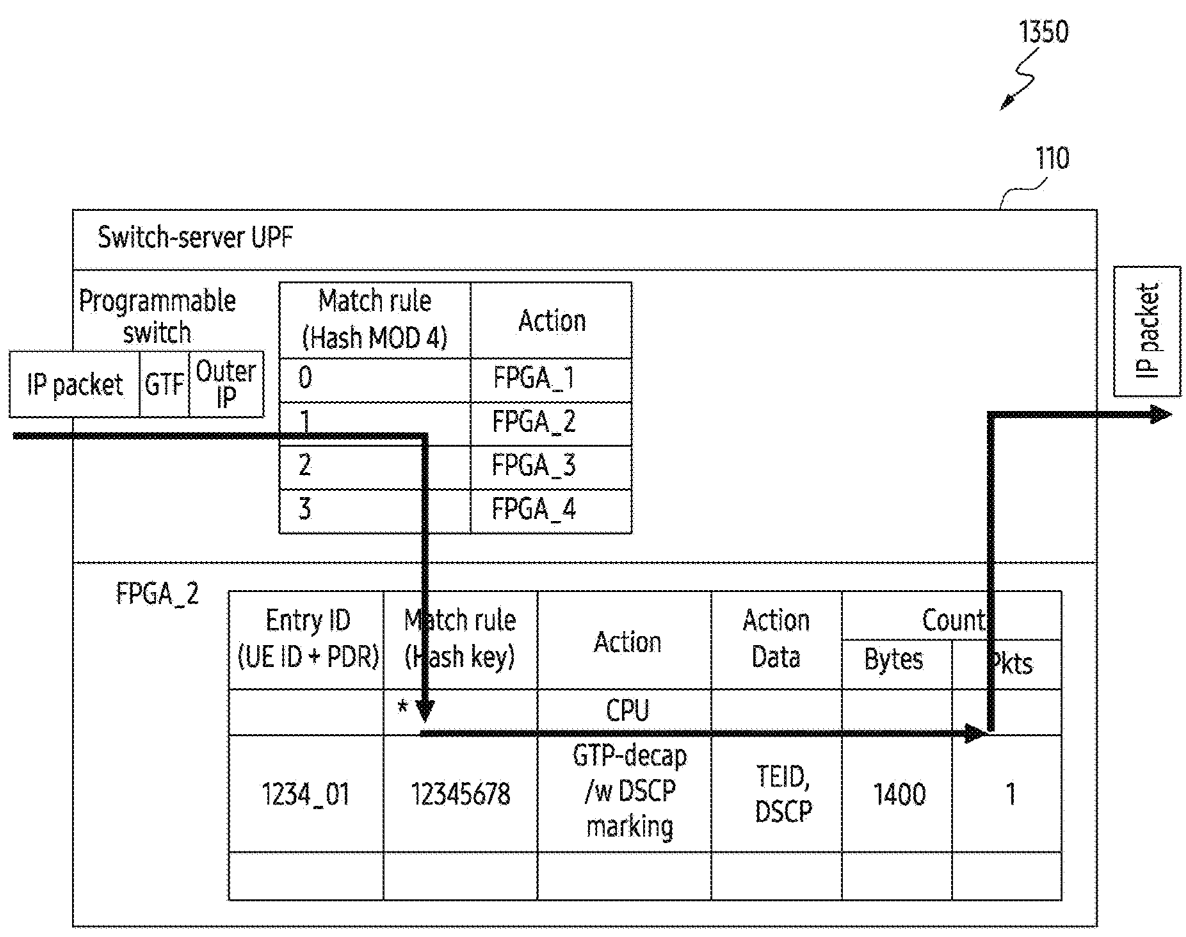

FIGS. 13A and 13B illustrate an example of a user datagram protocol (UDP) processing of a UPF according to various embodiments of the disclosure. In order to describe the UDP processing, an uplink packet is described as an example.

In FIG. 13A, a packet processing operation 1300 for a new flow of a switch server 110 and a commercial server 120 is described. The operations mentioned in FIG. 7A may be applied to FIG. 13A in the same or similar manner.

Referring to FIG. 13A, the switch server 110 may receive a UDP packet. The received packet may be a first packet, that is, a new packet. The switch server 110 may transfer the first packet to the commercial server 120.

The commercial server 120 may generate metadata. The commercial server 120 may include an action and action data of a flow of a corresponding packet. The commercial server 120 may transfer metadata to the switch server 110. According to an embodiment, the metadata may include a TEID. The TEID may be used for packet processing in the switch server 110. According to an embodiment, the metadata may include DSCP. The DSCP may be used for packet processing in the switch server 110. According to an embodiment, the metadata may include an entry ID. The entry ID may be determined based on a UE ID and a PDR. The entry ID may be used for a count per PDR. Charging and usage information on the processed packet may be updated in the commercial server 120.

The switch server 110 may generate a flow entry based on the metadata. The server 110 may process a packet, based on the flow entry. The switch server 110 may remove a GTP header and an outer IP header from the received packet. The switch server 110 may transfer an IP packet to the outside.

In FIG. 13B, a packet processing operation 1350 for a registered flow of the switch server 110 and the commercial server 120 is described. The operations mentioned in FIG. 7B may be applied to FIG. 13B in the same or similar manner.

Referring to FIG. 13B, the switch server 110 may receive a UDP packet. The received packet may be a second packet or a packet after the second. The switch server 110 may refer to the flow entry generated in FIG. 13A. The switch server 110 may refer to a flow entry in response to receiving of the packet. The switch server 110 may process the received packet based on the flow entry. The switch server 110 may remove the GTP header and the outer IP header from the received packet. The switch server 110 may transfer the IP packet to the outside.

According to an embodiment, the switch server 110 may measure usage of the processed packet. The switch server 110 may perform a packet count. A CPU (e.g., the CPU 215 of FIG. 2) of the switch server 110 may read a count value. For example, the CPU of the switch server 110 may collect a count value of the flow table periodically (e.g., every second). The CPU of the switch server 110 may collect the usage count per each user and per each PDR. The switch server 110 may transfer a collected result to the commercial server 120.

Figure 14:
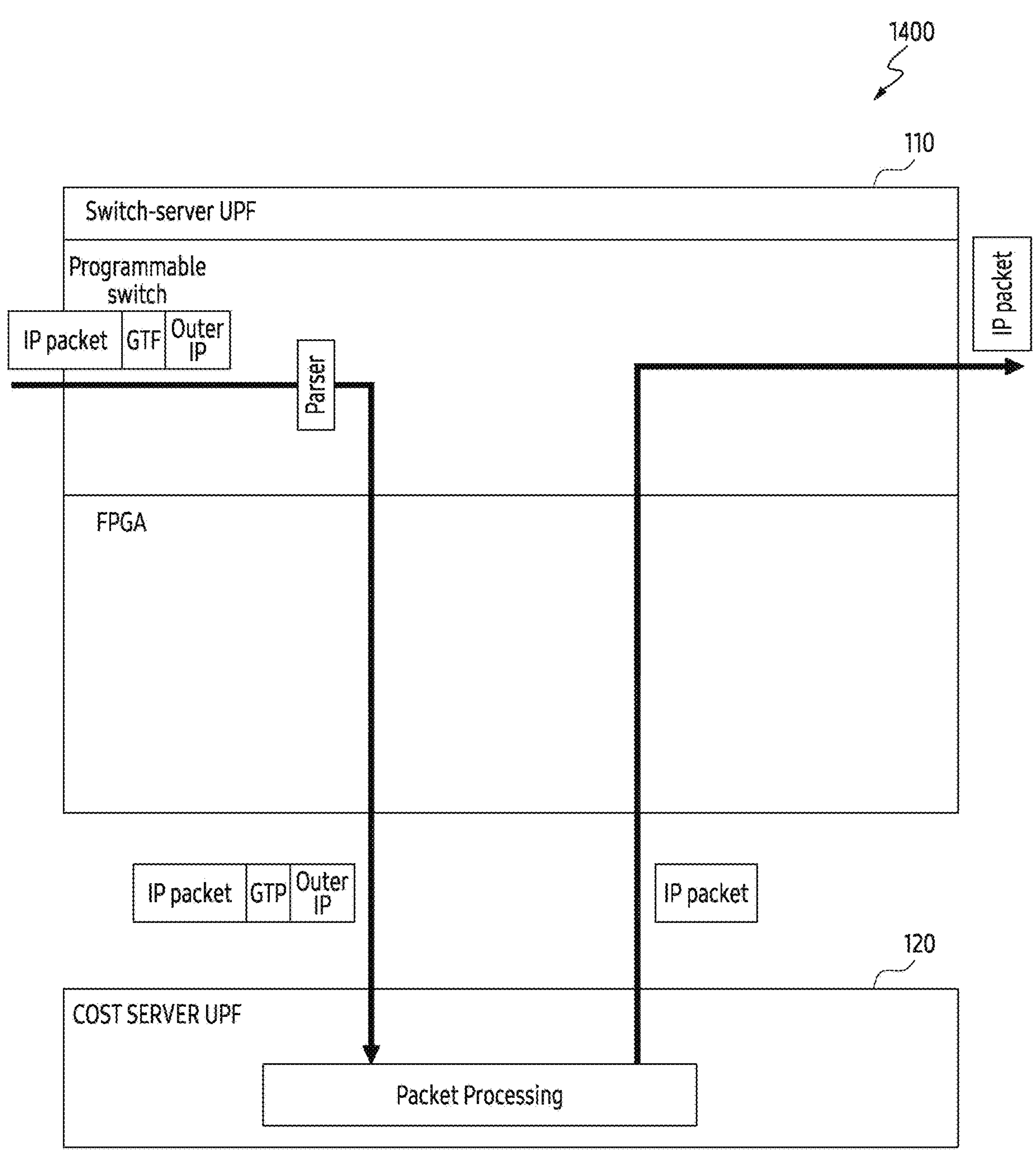
FIG. 14 illustrates an example of transmission control protocol (TCP) processing of an UPF according to an embodiment of the disclosure.

FIG. 14 illustrates an example 1400 of transmission control protocol (TCP) processing of an UPF according to an embodiment of the disclosure. In order to describe TCP processing, an uplink packet is described as an example.

Referring to FIG. 14, a switch server 110 may receive a TCP packet. The switch server 110 may perform packet filtering through a parser. The switch server 110 may directly transfer the TCP packet to a commercial server 120 based on identifying that the received packet is the TCP packet. A switch of the switch server 110 may directly transmit the TCP packet to the commercial server 120 without passing through a FPGA. The commercial server 120 may remove a GTP header and an outer IP header from the received packet. The commercial server 120 may provide an IP packet to the switch server 110. The switch server 110 may transfer the IP packet to the outside.

Although FIG. 14 illustrates that the processing of a TCP flow packet is always performed by the commercial server 120, offloading for the TCP flow packet may be set to the switch server 110 according to some other embodiments.

In FIGS. 13A, 13B, and 14, processing of a TCP flow and a UDP flow is described. For charging processing, the commercial server 120 may add usage of the TCP flow and usage of the UDP flow. The commercial server 120 may provide combined usage to a charging server. When usage is closer to a threshold value, the commercial server 120 may reset the switch server 110 so that offloading is not used with respect to remaining usage. For example, the commercial server 120 may delete an entry of a related UDP flow from the switch server. Thereafter, a packet with respect to the remaining usage may be processed or dropped in the commercial server 120. Also, the commercial server 120 may refuse to generate a new flow packet afterward.

According to embodiments of the disclosure, a method performed by a switch server including a programmable switch and one or more field programmable gate arrays (FPGAs) in a communication system may include receiving information on a flow table from an offloading server. The method may include receiving data packets. The method may include identifying a FPGA corresponding to the data packets. The method may include identifying whether the data packets are matched to a flow entry of the flow table of the FPGA or not. The method may include, in case that the data packets are matched to the flow entry of the flow table, processing the data packets based on the flow entry and transmitting the processed data packets. The method may include, in case that the data packets are not matched to the flow entry of the flow table, providing the data packets to the offloading server.

According to an embodiment, the flow table may include an entry identifier (ID), a hash key, an action, action data, and usage. The entry ID may be associated with a user equipment ID and a packet detection rule (PDR).

According to an embodiment, the information on the flow table may include an entry identifier (ID), a tunnel endpoint identifier (TEID), and a differentiated service code point (DSCP) value.

According to an embodiment, in case that the data packets are downlink packets, the processing of the data packets may include general packet radio service (GPRS) tunnelling protocol (GTP) capsulation and differentiated service code point (DSCP) marking. In case that the data packets are uplink packets, the processing of the data packets may include GTP decapsulation and DSCP marking.

According to an embodiment, the information on the flow table may be received from the offloading server in case that a header of the previous packet has a uniform resource indicator (URL) in a specified range. The information on the flow table may include destination internet protocol (IP) address information of the URL in the specified range.

According to embodiments of the disclosure, a method performed on an offloading server may include receiving a data packet from a switch server including a programmable switch and one or more field programmable gate arrays (FPGAs) in a communication system. The method may include processing the data packets. The method may include determining whether to generate a flow table for the data packets. The method may include, in case of a determination that the flow table for the data packets is generated, providing information on the flow table and the processed packets to the switch server. The method may include, in case of a determination that the flow table for the data packets is not generated, providing the processed packets to the switch server without the information on the flow table.

According to an embodiment, the flow table may include an entry identifier (ID), a hash key, an action, action data, and usage. The entry ID may be determined based on a user equipment ID and a packet detection rule (PDR).

According to an embodiment, the information on the flow table may include an entry identifier (ID), a tunnel endpoint identifier (TEID), and a differentiated service code point (DSCP) value.

According to an embodiment, in case that the data packets are downlink packets, the processing of the data packets may include general packet radio service (GPRS) tunnelling protocol (GTP) capsulation and differentiated service code point (DSCP) marking. In case that the data packets are uplink packets, the processing of the data packets may include GTP decapsulation and DSCP marking.

According to an embodiment, the information on the flow table may be transmitted to the switch server in case that a header of the previous packet has a uniform resource indicator (URL) in a specified range. The information on the flow table may include destination internet protocol (IP) address information of the URL in the specified range.

According to an embodiment, a switch server in a communication system may comprise a processor, a programmable switch, and one or more field programmable gate arrays (FPGAs). The programmable switch may be configured to receive information on a flow table from an offloading server. The programmable switch may be configured to receive data packets. The programmable switch may be configured to identify a FPGA corresponding to the data packets. The programmable switch may be configured to identify whether the data packets are matched to a flow entry of the flow table of the FPGA or not. The programmable switch may be configured to, in case that the data packets are matched to the flow entry of the flow table, process the data packets based on the flow entry and transmit the processed data packets. The programmable switch may be configured to, in case that the data packets are not matched to the flow entry of the flow table, provide the data packets to the offloading server.

According to an embodiment, the flow table may include an entry identifier (ID), a hash key, an action, action data, and usage. The entry ID may be associated with a user equipment ID and a packet detection rule (PDR).

According to an embodiment, the information on the flow table may include an entry identifier (ID), a tunnel endpoint identifier (TEID), and a differentiated service code point (DSCP) value.

According to an embodiment, in case that the data packets are downlink packets, the processing of the data packets may include general packet radio service (GPRS) tunnelling protocol (GTP) capsulation and differentiated service code point (DSCP) marking. In case that the data packets are uplink packets, the processing of the data packets may include GTP decapsulation and DSCP marking.

According to an embodiment, the information on the flow table may be received from the offloading server in case that a header of the previous packet has a uniform resource indicator (URL) in a specified range. The information on the flow table may include destination internet protocol (IP) address information of the URL in the specified range.

According to an embodiment, an offloading server in a communication system may comprise at least one transceiver, and at least one processor. The at least one processor may be configured to receive, from a switch server including a programmable switch and one or more field programmable gate arrays (FPGAs), data packets, and process the data packets. The at least one processor may be configured to determine whether to generate a flow table for the data packets. The at least one processor may be configured to, in case of a determination that the flow table for the data packets is generated, provide information on the flow table and the processed packets to the switch server. The at least one processor may be configured to, in case of a determination that the flow table for the data packets is not generated, provide the processed packets to the switch server without the information on the flow table.

According to an embodiment, the flow table may include an entry identifier (ID), a hash key, an action, action data, and usage. The entry ID is determined based on a user equipment ID and a packet detection rule (PDR).

According to an embodiment, the information on the flow table may include an entry identifier (ID), a tunnel endpoint identifier (TEID), and a differentiated service code point (DSCP) value.

According to an embodiment, in case that the data packets are downlink packets, the processing of the data packets may include general packet radio service (GPRS) tunnelling protocol (GTP) capsulation and differentiated service code point (DSCP) marking. In case that the data packets are uplink packets, the processing of the data packets may include GTP decapsulation and DSCP marking.

According to an embodiment, the information on the flow table may be transmitted to the switch server in case that a header of the previous packet has a uniform resource indicator (URL) in a specified range. The information on the flow table may include destination internet protocol (IP) address information of the URL in the specified range.

In embodiments of the disclosure, embodiments in which one or more FPGAs are combined with a switch-chip are described to compensate for a small memory of the switch-chip. However, all embodiments of the disclosure are not limitedly interpreted by this structure. A switch-server in which not only FPGAs but also independent chips are combined with the switch-chip, may also be understood as an embodiment of the disclosure, in order to compensate for a small memory. In addition, according to another embodiment, the switch server may perform an operation with the COTS server described through FIGS. 6, 7A, 7B, 8A, 8B, 9 to 12, 13A, 13B, and 14 without using the FPGA through the memory of the switch-chip.

Embodiments of the disclosure may reduce cost, the number of servers, and power in implementing a large-capacity packet processing system, while simultaneously supporting easier network operation due to the reduced servers.

Methods according to the embodiments described in a claim or a description of the disclosure may be implemented in a form of hardware, software, or a combination of hardware and software.

In case of implementing as software, a computer-readable storage medium for storing one or more programs (software modules) may be provided. The one or more programs stored in the computer-readable storage medium are configured for execution by one or more processors in an electronic device. The one or more programs include instructions that cause the electronic device to execute methods according to the claim or description described in the disclosure.

These programs (software modules, software) may be stored in non-volatile memory including random access memory and flash memory, read only memory (ROM), electrically erasable programmable read only memory (EEPROM), magnetic disk storage device, compact disc-ROM (CD-ROM), digital versatile discs (DVDs), or another form of optical storage device, and magnetic cassette. Alternatively, it may be stored in memory configured to some or all combinations thereof. Also, a plurality of each component memory may be included.

Additionally, the program may be stored in an attachable storage device which is capable of accessing through a communication network such as the internet, an intranet, a local area network (LAN), a wide area network (WAN), a storage area network (SAN), or a combination thereof. This storage device may connect to a device performing an embodiment of the disclosure through an external port. In addition, a separate storage device on the communication network may connect to a device performing an embodiment of the disclosure.

In the above-described specific embodiments of the disclosure, components included in the disclosure are expressed in a singular or a plural according to presented specific embodiments. However, singular or plural expressions are selected appropriately for a situation presented for convenience of explanation, and this disclosure is not limited to singular or plural components, and even components expressed in plural may be composed in singular, or components expressed in singular may be composed in plural.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device individually or collectively, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a switch server including a programmable switch and one or more field programmable gate arrays (FPGAs) in a communication system, the method comprising:

receiving information on a flow table from an offloading server;

receiving data packets;

identifying an FPGA corresponding to the data packets;

identifying whether the data packets match a flow entry of the flow table of the FPGA;

if the data packets match the flow entry of the flow table, processing the data packets based on the flow entry and transmitting the processed data packets; and if the data packets do not match the flow entry of the flow table, providing the data packets to the offloading server.

2. The method of claim 1, wherein the flow table includes an entry identifier (ID), a hash key, an action, action data, and usage, and wherein the entry ID is associated with a user equipment ID and a packet detection rule (PDR).

3. The method of claim 1, wherein the information on the flow table includes an entry identifier (ID), a tunnel endpoint identifier (TEID), and a differentiated service code point (DSCP) value.

4. The method of claim 1, wherein, in case that the data packets are downlink packets, the processing of the data packets includes general packet radio service (GPRS) tunnelling protocol (GTP) capsulation and differentiated service code point (DSCP) marking, and wherein, in case that the data packets are uplink packets, the processing of the data packets includes GTP decapsulation and DSCP marking.

5. The method of claim 1, wherein the information on the flow table is received from the offloading server in case that a header of a previous packet has a uniform resource indicator (URL) in a specified range, and wherein the information on the flow table includes destination internet protocol (IP) address information of the URL in the specified range.

6. The method of claim 1, wherein the switch server and the offloading server are configured to perform operations of a user plane function (UPF).

7. The method of claim 6, wherein the offloading server is configured to process user plane data packets and perform processing of control signaling related to session management function (SMF), and wherein the switch server is configured to process user plane data packets.

8. A switch server in a communication system, comprising:

a processor;

a programmable switch; and one or more field programmable gate arrays (FPGAs), wherein the programmable switch is configured to:

receive information on a flow table from an offloading server, receive data packets, identify an FPGA corresponding to the data packets, identify whether the data packets are matched to a flow entry of the flow table of the FPGA or not, if the data packets are matched to the flow entry of the flow table, process the data packets based on the flow entry and transmit the processed data packets, and if the data packets are not matched to the flow entry of the flow table, provide the data packets to the offloading server.

9. The switch server of claim 8, wherein the flow table includes an entry identifier (ID), a hash key, an action, action data, and usage, and wherein the entry ID is associated with a user equipment ID and a packet detection rule (PDR).

10. The switch server of claim 8, wherein the information on the flow table includes an entry identifier (ID), a tunnel endpoint identifier (TEID), and a differentiated service code point (DSCP) value.

11. The switch server of claim 8, wherein, in case that the data packets are downlink packets, the processing of the data packets includes general packet radio service (GPRS) tunnelling protocol (GTP) capsulation and differentiated service code point (DSCP) marking, and wherein, in case that the data packets are uplink packets, the processing of the data packets includes GTP decapsulation and DSCP marking.

12. The switch server of claim 8, wherein the information on the flow table is received from the offloading server in case that a header of a previous packet has a uniform resource indicator (URL) in a specified range, and wherein the information on the flow table includes destination internet protocol (IP) address information of the URL in the specified range.

13. The switch server of claim 8, wherein the switch server and the offloading server are configured to perform operations of a user plane function (UPF).

14. The switch server of claim 13, wherein the offloading server is configured to process user plane data packets and perform processing of control signaling related to session management function (SMF), and wherein the switch server is configured to process user plane data packets.

15. An offloading server in a communication system, the offloading server comprising:

at least one transceiver;

memory storing one or more computer programs; and one or more processors communicatively coupled to the at least one transceiver and the memory, wherein the one or more computer programs include computer-executable instructions that, when executed by the one or more processors individually or collectively, cause the offloading server to:

receive, from a switch server including a programmable switch and one or more field programmable gate arrays (FPGAs), data packets, process the data packets, determine whether to generate a flow table for the data packets, if the flow table for the data packets is generated, provide information on the flow table and the processed packets to the switch server, and if the flow table for the data packets is not generated, provide the processed packets to the switch server without the information on the flow table.

16. The offloading server of claim 15, wherein the flow table includes an entry identifier (ID), a hash key, an action, action data, and usage, and wherein the entry ID is determined based on a user equipment ID and a packet detection rule (PDR).

17. The offloading server of claim 15, wherein the information on the flow table includes an entry identifier (ID), a tunnel endpoint identifier (TEID), and a differentiated service code point (DSCP) value.

18. The offloading server of claim 15, wherein, in case that the data packets are downlink packets, the processing of the data packets includes general packet radio service (GPRS) tunnelling protocol (GTP) capsulation and differentiated service code point (DSCP) marking, and wherein, in case that the data packets are uplink packets, the processing of the data packets includes GTP decapsulation and DSCP marking.

19. The offloading server of claim 15, wherein the information on the flow table is transmitted to the switch server in case that a header of a previous packet has a uniform resource indicator (URL) in a specified range, and wherein the information on the flow table includes destination internet protocol (IP) address information of the URL in the specified range.

20. The offloading server of claim 15, wherein the switch server and the offloading server are configured to perform operations of a user plane function (UPF), wherein the offloading server is configured to process user plane data packets and perform processing of control signaling related to session management function (SMF), and wherein the switch server is configured to process user plane data packets.

* * * * *